(12) United States Patent
Matsubayashi et al.

(10) Patent No.: US 11,606,503 B2
(45) Date of Patent: Mar. 14, 2023

(54) INFORMATION PROCESSING APPARATUS, SETTING METHOD, AND STORAGE MEDIUM

(71) Applicant: CANON KABUSHIKI KAISHA, Tokyo (JP)

(72) Inventors: Kazuhiro Matsubayashi, Yokohama (JP); Rei Ishikawa, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 16/922,913

(22) Filed: Jul. 7, 2020

(65) Prior Publication Data

US 2021/0014425 A1 Jan. 14, 2021

(30) Foreign Application Priority Data

Jul. 11, 2019 (JP) .............................. JP2019-129614

(51) Int. Cl.
*H04N 5/232* (2006.01)
*H04N 5/247* (2006.01)
*H04N 5/222* (2006.01)

(52) U.S. Cl.
CPC ....... *H04N 5/23296* (2013.01); *H04N 5/2224* (2013.01); *H04N 5/23206* (2013.01); *H04N 5/247* (2013.01)

(58) Field of Classification Search
None
See application file for complete search history.

(56) References Cited

U.S. PATENT DOCUMENTS 10,373,342 B1 * 8/2019 Perez, III .............. G06F 3/0346
2018/0160049 A1 * 6/2018 Aizawa ................ H04N 5/2224

FOREIGN PATENT DOCUMENTS

JP 2018092491 A 6/2018

* cited by examiner

*Primary Examiner* — James M Anderson, II
(74) *Attorney, Agent, or Firm* — Canon U.S.A., Inc. IP Division

(57) ABSTRACT

An information processing apparatus includes a first reception unit configured to receive an input corresponding to an operation on a first operation unit, a second reception unit configured to receive an input corresponding to an operation on a second operation unit, a first setting unit configured to set a target position to be included in a visual field according to a virtual viewpoint corresponding to a virtual viewpoint image, based on an input received by the first reception unit, and a second setting unit configured to set a position and orientation of the virtual viewpoint relative to the target position, based on an input received by the second reception unit.

20 Claims, 17 Drawing Sheets

INFORMATION PROCESSING APPARATUS, SETTING METHOD, AND STORAGE MEDIUM

BACKGROUND

Field of the Disclosure

The present disclosure relates to setting of a virtual viewpoint corresponding to a virtual viewpoint image.

Description of the Related Art

There is a technique for generating a virtual viewpoint image with an arbitrarily changeable viewpoint based on a plurality of captured images acquired in synchronous image capturing by using a plurality of imaging apparatuses installed at different positions. More specifically, based on the plurality of captured images, the technique generates three-dimensional shape data of subjects (objects) included in the captured images, and performs rendering processing based on the position and orientation of a virtual viewpoint, thus generating a virtual viewpoint image.

The virtual viewpoint corresponding to the virtual viewpoint image can be changed, for example, by operating controllers. Japanese Patent Application Laid-Open No. 2018-092491 discusses a technique for operating a virtual viewpoint by using three different joy sticks. More specifically, the technique controls the lateral and longitudinal movements of the virtual viewpoint by operating a first joy stick, controls the vertical movement and roll rotation of the virtual viewpoint by operating a second joy stick, and controls the pitch and yaw rotations of the virtual viewpoint by operating a third joy stick.

To obtain a virtual viewpoint image desired by the user, it is demanded to improve the convenience of operations relating to the setting of the virtual viewpoint. In a soccer game, for example, the user may operate a virtual viewpoint to change the direction of object viewing while including moving objects such as players and the ball in the visual field according to the virtual viewpoint. When implementing such a virtual viewpoint operation by using the technique discussed in Japanese Patent Application Laid-Open No. 2018-092491, the user changes the position of the virtual viewpoint relative to an object by using a first and a second joy stick to change the direction of object viewing. Further, the user changes the orientation of the virtual viewpoint by using a third joy stick so that the object does not go outside the visual field as a result of the positional change of the virtual viewpoint. It is difficult for one user to perform such complicated operations. In a case where a plurality of users shares the operations on a plurality of joy sticks, it is difficult to accurately perform the operations in cooperation to obtain a desired virtual viewpoint image. Similar issues may also arise when using operation units other than the joy sticks.

SUMMARY

According to an aspect of the present disclosure, an information processing apparatus includes a first reception unit configured to receive an input corresponding to an operation on a first operation unit, a second reception unit configured to receive an input corresponding to an operation on a second operation unit, a first setting unit configured to set a target position to be included in a visual field according to a virtual viewpoint corresponding to a virtual viewpoint image, based on an input received by the first reception unit, and a second setting unit configured to set a position and orientation of the virtual viewpoint relative to the target position, based on an input received by the second reception unit.

Further features of the present disclosure will become apparent from the following description of exemplary embodiments with reference to the attached drawings.

DESCRIPTION OF THE EMBODIMENTS

[System Configuration]

Figure 1:
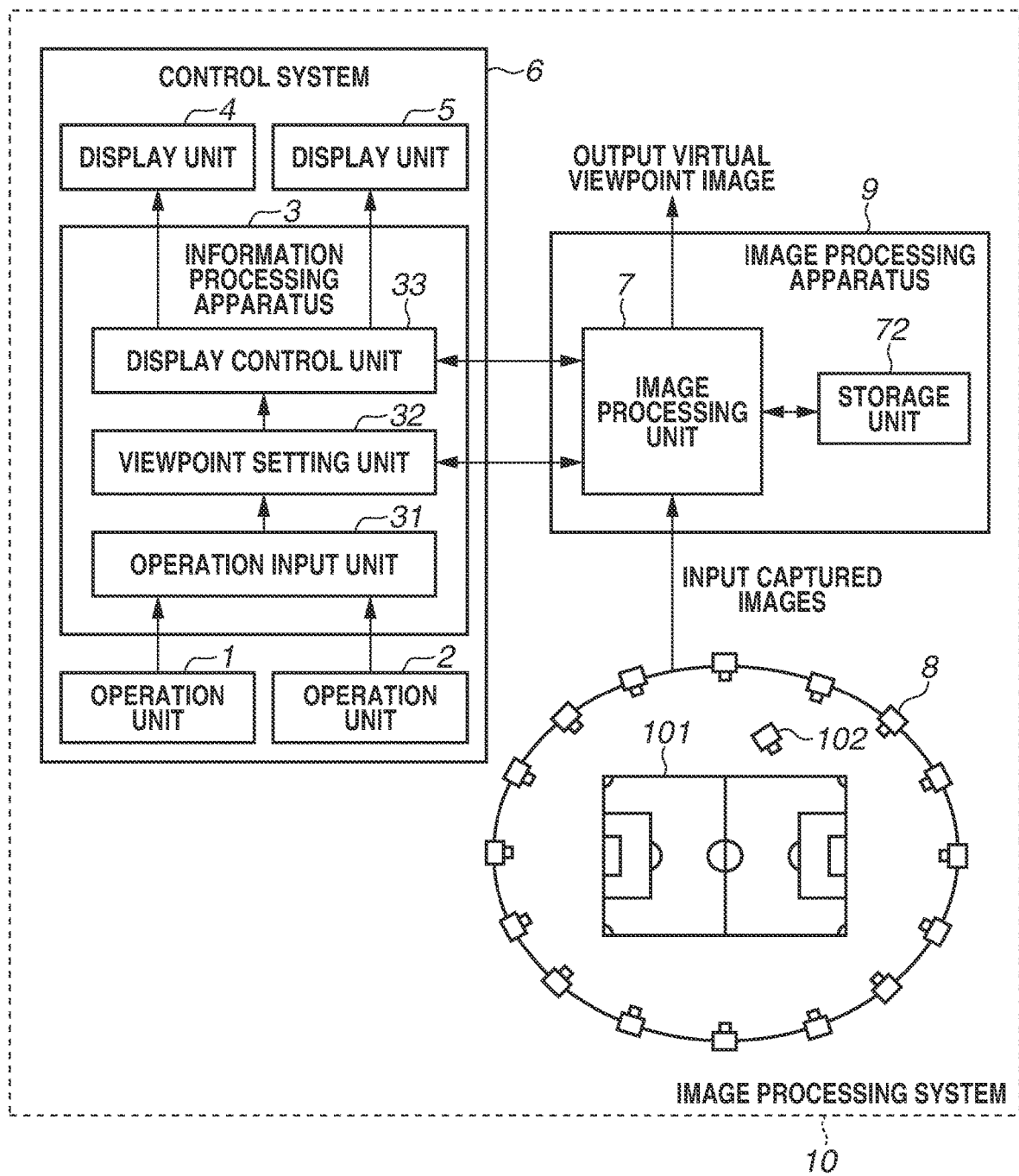
FIG. 1 illustrates an example of a configuration of an image processing system.

FIG. 1 illustrates an example of a configuration of an image processing system 10 according to the present exemplary embodiment. The image processing system 10 is a system for generating a virtual viewpoint image representing the view from a specified virtual viewpoint based on a plurality of images captured by using a plurality of imaging apparatuses and a specified virtual viewpoint. A virtual viewpoint image according to the present exemplary embodiment is also referred to as a free viewpoint video image, but is not limited to an image corresponding to a viewpoint freely (arbitrarily) specified by the user. For example, an image corresponding to a viewpoint selected by the user from a plurality of candidates is also included in the virtual viewpoint image. Although the present exemplary embodiment will be described below centering on a case where a virtual viewpoint image is a moving image, the virtual viewpoint image may be a still image.

The image processing system 10 includes a plurality of imaging apparatuses 8 for capturing an imaging region 101 from a plurality of directions. According to the present exemplary embodiment, the imaging region 101 as an imaging target is a stadium where soccer games are held. However, the imaging region 101 is not limited thereto but may be a stadium where rugby games and karate tournaments are held or a stage where concerts and dramas are performed. As illustrated in FIG. 1, the plurality of imaging apparatuses 8 is installed at different positions to surround such imaging region 101 and captures images in a synchronized way. The plurality of imaging apparatuses 8 does not need to be installed over the entire circumference of the imaging region 101 but may be installed over a partial circumference of the imaging region 101 depending on limitations on the installation site. The number of imaging apparatus is not limited to the number in the example illustrated in FIG. 1. In a case where the imaging region 101 is a soccer stadium, for example, a total of approximately 30 imaging apparatuses 8 may be installed around the stadium. The imaging apparatuses 8 having different functions including telephotographic cameras and wide-angle cameras may be installed.

An image processing apparatus 9 includes an image processing unit 7 and a storage unit 72 and connects to and communicates with the information processing apparatus 3 and the plurality of imaging apparatuses 8 to generate a virtual viewpoint image. A virtual viewpoint image is generated, for example, by using the following method. Firstly, when the plurality of imaging apparatuses 8 performs image capturing from different directions, a plurality of images (a plurality of viewpoint images) is captured and input to the image processing unit 7. The image processing unit 7 acquires a foreground image formed by extracting foreground regions corresponding to predetermined objects such as persons and the ball, and a background image formed by extracting background regions (regions other than foreground regions) from the plurality of viewpoint images. The image processing unit 7 generates a foreground model representing the three-dimensional shape of a predetermined object, and texture data for coloring the foreground model based on the foreground image. The image processing unit 7 also generates texture data for coloring the background model representing the three-dimensional shape of the background such as a stadium based on the background image. Then, the image processing unit 7 maps the texture data on the foreground and the background models, and subject the resultant data to rendering according to the virtual viewpoint indicated by the viewpoint information acquired from the information processing apparatus 3. The generated virtual viewpoint image is output to the storage unit 72, the information processing apparatus 3, or other external networks. However, the method for generating a virtual viewpoint image is not limited thereto, and various types of methods are usable. Examples of usable methods include a method for generating virtual viewpoint image through projection conversion of the captured image without using a three-dimensional model.

The viewpoint information used to generate a virtual viewpoint image is information indicating the position and orientation of a virtual viewpoint. More specifically, the viewpoint information is a parameter set including a parameter representing the three-dimensional position of the virtual viewpoint and a parameter representing the orientation of the virtual viewpoint in the pan, tilt, and roll directions. The contents of the viewpoint information are not limited thereto. For example, a parameter set as the viewpoint information may include a parameter representing the field size (viewing angle) according to the virtual viewpoint. The viewpoint information may include a plurality of parameter sets. For example, the viewpoint information may include a plurality of parameter sets respectively corresponding to a plurality of frames configuring a moving image of the virtual viewpoint image, and indicate the position and orientation of the virtual viewpoint at each of a plurality of continuous time points.

In the descriptions of the present exemplary embodiment, the term "virtual camera" is used. A virtual camera 102 illustrated in FIG. 1 is different from the plurality of imaging apparatuses 8 actually installed around the imaging region 101. The virtual camera 102 is a concept for conveniently describing a virtual viewpoint related to the generation of a virtual viewpoint image. More specifically, the virtual viewpoint image can be considered as an image captured from a virtual viewpoint set in the virtual space associated with the imaging region 101. The position and orientation of the viewpoint in the virtual imaging can be represented as the position and orientation of the virtual camera 102. The visual field according to the virtual viewpoint is equivalent to the visual field of the virtual camera 102. In other words, when a camera is assumed to exist at the position of a virtual viewpoint set in a space, the virtual viewpoint image can be considered as an image which simulates a captured image acquired by the camera. However, it is not necessary to use a concept of the virtual camera 102 to implement the configuration of the present exemplary embodiment. More specifically, it is necessary that at least information representing a specific position in a space and information representing the orientation therein are set and that a virtual viewpoint image is generated according to the set information.

Not only a virtual viewpoint image generated by the image processing unit 7 but also material data related to the generation of a virtual viewpoint image may be stored in the storage unit 72. According to the present exemplary embodiment, data for generating a virtual viewpoint image (captured images acquired by the imaging apparatuses 8 and data generated based on the captured images) are referred to as material data. Examples of material data generated based on captured images include data of the foreground and background images extracted from the captured images, three-dimensional model data representing the object shape in the three-dimensional space, and texture data for coloring the three-dimensional model.

As long as the material data is data for generating a virtual viewpoint image, the type of the material data is not limited. For example, the material data may include camera parameters representing imaging conditions of the imaging apparatuses 8 for acquiring captured images. While examples of material data when generating a virtual viewpoint image by using a three-dimensional model has been described above, when generating a virtual viewpoint image without using a three-dimensional model, data necessary for generating a virtual viewpoint image may be different from the above-described example of material data. As described above, material data may be different according to the method for generating a virtual viewpoint image. Material data to be stored in the storage unit 72 may include three-dimensional model data generated in computer-aided design (CAD) in addition to the data generated based on the above-described captured images.

The control system 6 illustrated in FIG. 1 includes an operation unit 1, an operation unit 2, an information processing apparatus 3, a display unit 4, and a display unit 5, and is used to set a virtual viewpoint corresponding to a virtual viewpoint image based on the user operations. The operation units 1 and 2 include a joy stick, a keyboard, a mouse, and a touch panel, which are subjected to operations by the user (operator). The display units 4 and 5 include a liquid crystal display and light emitting diode (LED), and display images to the user based on the output from the information processing apparatus 3.

The information processing apparatus 3 includes an operation input unit 31, a viewpoint setting unit 32, and a display control unit 33. The operation input unit 31 receives inputs corresponding to the user operations from the operation units 1 and 2, and performs processing such as the conversion of a signal indicating a physical operation into a logical operation instruction. This makes it possible to absorb physical differences in the device type and interface (VF) of the operation units. The viewpoint setting unit 32 sets the position and orientation of a virtual viewpoint based on an operation instruction from the operation input unit 31 and transmits viewpoint information indicating the set virtual viewpoint to the image processing apparatus 9. The display control unit 33 instructs the display unit 4 to display a Graphical User Interface (GUI) for enabling the user to operate the operation unit 1 and instructs the display unit 5 to display a GUI for enabling the user to operate the operation unit 2. The display control unit 33 also receives a virtual viewpoint image from the image processing apparatus 9 and instructs one or both of the display units 4 and 5 to display the virtual viewpoint image. The display control unit 33 may receive images captured by the imaging apparatuses 8 and display the images on the display unit 4 or 5.

The configuration of the image processing system 10 is not limited to the configuration illustrated in FIG. 1. For example, the information processing apparatus 3 and the image processing apparatus 9 may be integrally configured. In addition, a plurality of information processing apparatuses 3 may be connected to and communicate with the image processing apparatus 9. The functions of the image processing apparatus 9 may be implemented by a plurality of apparatuses. For example, the generation of a foreground image, the generation of a three-dimensional model, and the generation of a virtual viewpoint image may be performed by different apparatuses.

[Hardware Configuration]

Figure 2:
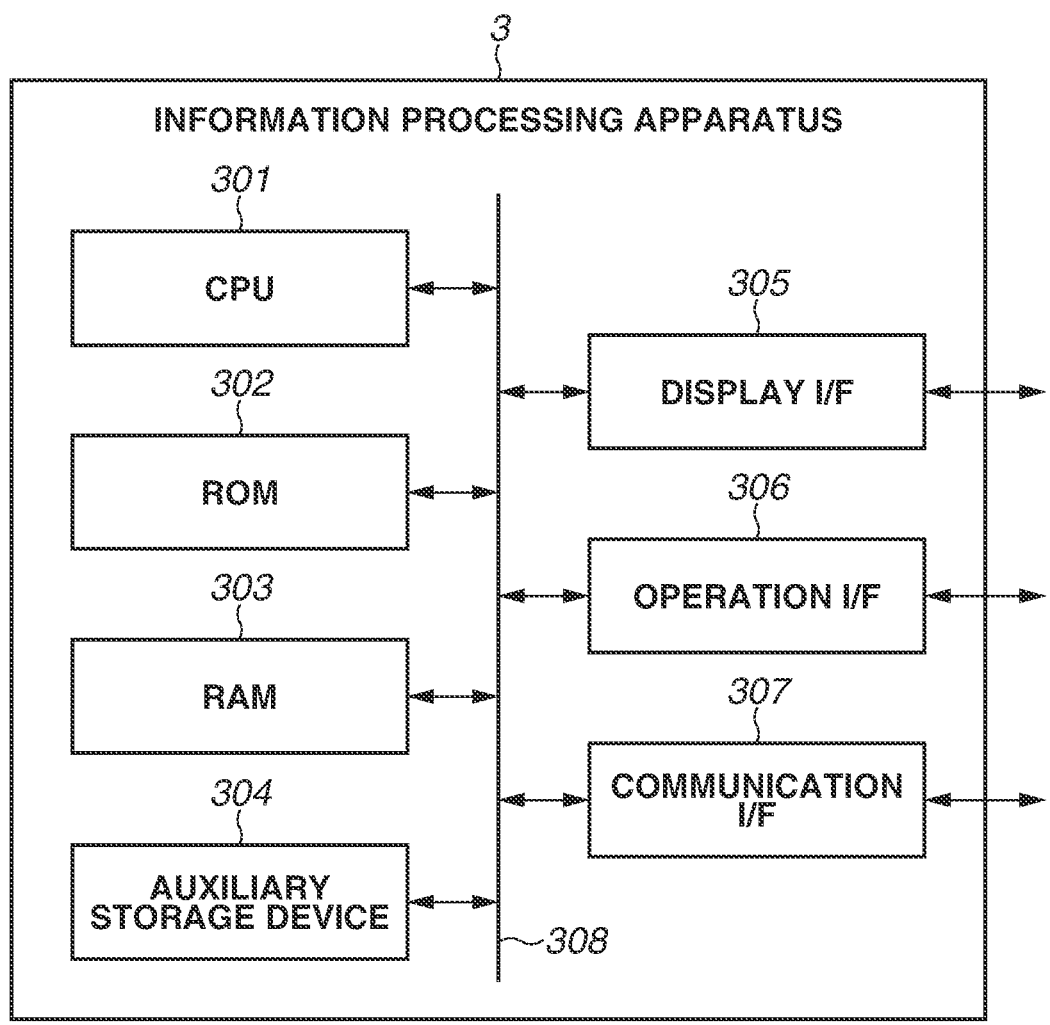
FIG. 2 illustrates an example of a hardware configuration of an information processing apparatus.

The hardware configuration of the information processing apparatus 3 will be described below with reference to FIG. 2. The hardware configuration of the image processing apparatus 9 is also similar to the configuration of the information processing apparatus 3 (described below). Alternatively, the functions of the image processing apparatus 9 may be integrated with the hardware of the information processing apparatus 3. The information processing apparatus 3 includes a central processing unit (CPU) 301, a read only memory (ROM) 302, a random access memory (RAM) 303, an auxiliary storage device 304, a display I/F 305, an operation I/F 306, a communication I/F 307, and a bus 308.

The CPU 301 controls the entire information processing apparatus 3 by using a computer program and data stored in the ROM 302 and the RAM 303 to implement the functions of the information processing apparatus 3 illustrated in FIG. 1. The information processing apparatus 3 may include one or a plurality of dedicated hardware components different from the CPU 301, and at least part of the processing by the CPU 301 may be executed by the dedicated hardware components. Examples of dedicated hardware components include an Application Specific Integrated Circuit (ASIC), a Field Programmable Gate Array (FPGA), and a Digital Signal Processor (DSP). The ROM 302 stores programs which do not need to be modified. The RAM 303 temporarily stores programs and data supplied from the auxiliary storage device 304 and data supplied from the outside via the communication I/F 307. The auxiliary storage device 304 including a hard disk drive stores various types of data such as image data and audio data.

The display I/F 305 used for communication with the display units 4 and 5 outputs video image signals to the display units 4 and 5. The operation I/F 306 used for communication with the operation units 1 and 2 receives operation signals corresponding to the user operations from the operation units 1 and 2. The communication I/F 307 is used for communication with an apparatus outside the information processing apparatus 3. For example, in a case where the information processing apparatus 3 is wiredly connected to an external apparatus, a communication cable is connected to the communication I/F 307. If the information processing apparatus 3 has a function of wirelessly communicating with an external apparatus, the communication VF 307 includes an antenna. The bus 308 connects between the components of the information processing apparatus 3 and transmits information. Although, in the present exemplary embodiment, the operation units 1 and 2 and the display units 4 and 5 exist as different devices from the information processing apparatus 3, at least any one of these units may be included in the information processing apparatus 3.

[Virtual Viewpoint Operations]

Figure 3:
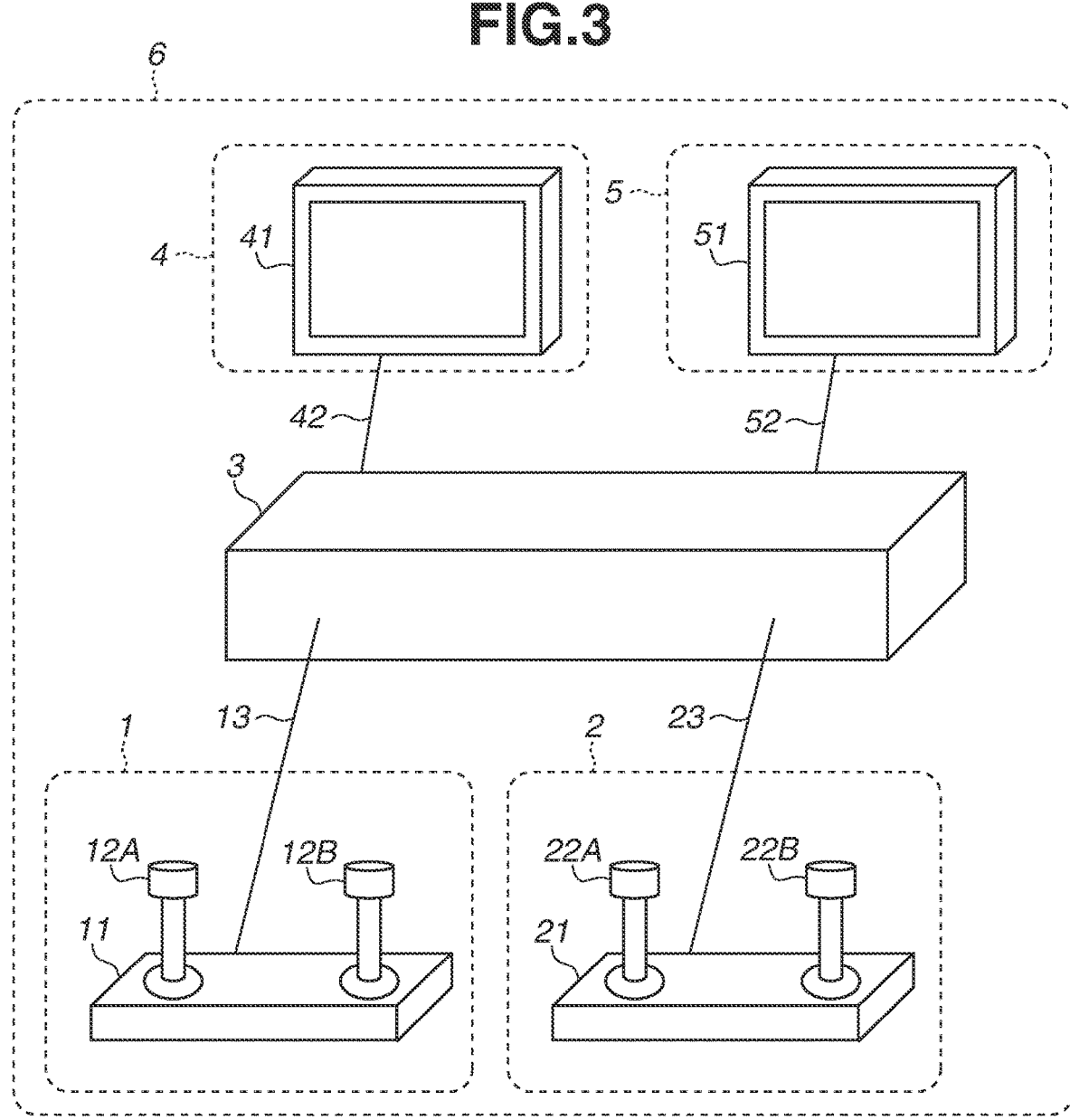
FIG. 3 illustrates an example of a device configuration of a control system.

An example of an operating method for setting a virtual viewpoint corresponding to a virtual viewpoint image will be described below. FIG. 3 illustrates an example of a specific device configuration of the operation units 1 and 2, the information processing apparatus 3, and the display units 4 and 5. Referring to FIG. 3, the operation unit 1 includes a console 11 to which a joy stick 12A and a joy stick 12B are attached. Based on the operations on the joy sticks 12A and 12B, an operation signal is generated by an electric circuit of the console 11. The operation signal is transmitted to the information processing apparatus 3 via an operation signal cable 13. Likewise, the operation unit 2 includes a console 21 for generating an operation signal based on the operations on a joy stick 22A and a joy stick 22B. The operation signal is also transmitted to the information processing apparatus 3 via an operation signal cable 23. The operation units 1 and 2 can be operated independently of each other. For example, as illustrated in FIG. 3, each of the operation units 1 and 2 includes a physically independent device (console).

According to the present exemplary embodiment, a plurality of independently operable operation units means that the operation on one operation unit does not directly limit the operation on the other operation unit. More specifically, a plurality of independently operable operation units is not limited to operation units included in separate housings. The joy sticks 12A and 12B illustrated in FIG. 3 are also independently operable operation units. For example, operation units such as a plurality of different buttons on the same operation device are also independently operable operation units if operations on one operation unit do not directly limit the operation on the other operation unit.

The display unit 4 illustrated in FIG. 3 includes one independent display apparatus 41. A video image signal output from the information processing apparatus 3 is transmitted to the display apparatus 41 via an image signal cable 42. Likewise, for the display unit 5, a video image signal output from the information processing apparatus 3 is transmitted to a display apparatus 51 via an image signal cable 42. The operation units 1 and 2 do not need to have the same configuration. Likewise, the display units 4 and 5 do not need to have the same configuration. The display units 4 and 5 may be different display areas on the same display apparatus.

Examples will be described below centering on a case where the operation units 1 and 2 are operated by different operators. A first operator operates the operation unit 1 while monitoring the image displayed on the display unit 4, and a second operator operates the operation unit 2 while monitoring the image displayed on the display unit 5. Each operator operates two joy sticks, i.e., one joy stick with the right hand and the other joy stick with the left hand. However, the operation method using the control system 6 is not limited thereto. For example, the two joy sticks may be operated by different operators.

FIGS. 4A to 4D illustrate operations by using the operation unit 1 for setting a three-dimensional position of a target point 103. A target point according to the present exemplary embodiment refers to a position to be included in the visual field of the virtual camera 102, i.e., a target position to be displayed in a virtual viewpoint image. For example, by controlling the virtual camera 102 so that a target point is adjusted to a specific subject (a player, the ball, or a goal) and is positioned in the line-of-sight direction of the virtual camera 102, a virtual viewpoint image with the specific subject captured at the center can be generated. The operator may operate the operation unit 1 to change the target point from the specific subject to other subject or set the target point to a position in a space where no subject exists (for example, above the specific subject and at the center position between a plurality of subjects).

Figure 4A:
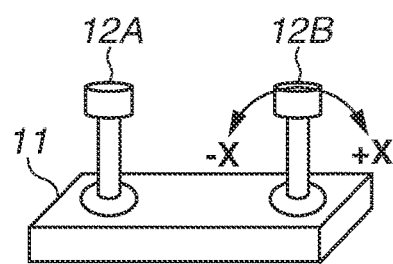
FIGS. 4A to 4D illustrate operations using operation units.
Figure 4B:
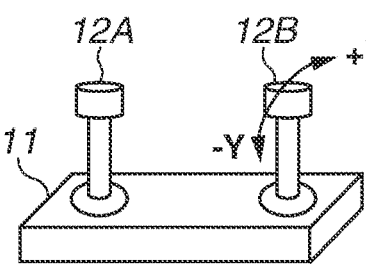
Figure 4C:
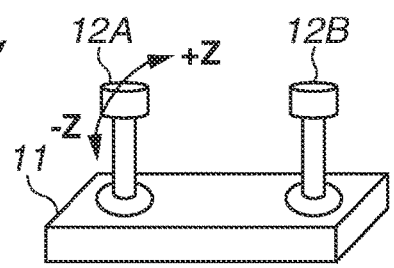
Figure 4D:
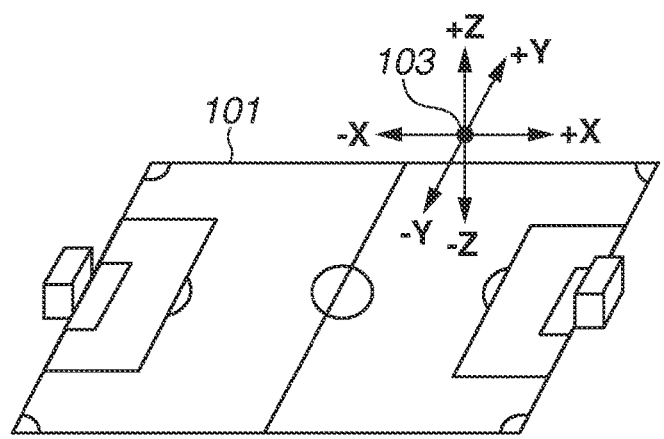

When the first operator tilts the levers of the joysticks 12A and 12B in a desired direction around 360 degrees, the joy sticks 12A and 12B output the lateral component value and the longitudinal component value corresponding to the direction and amount of tilt. When the joy stick 12B is operated as illustrated in FIG. 4A, the X-coordinate value of the target point 103 illustrated in FIG. 4D varies according to the lateral component value. The amount of change the X-coordinate value with respect to the lateral component value may be adjusted according to the preference of the operator. This also applies to each of the following operations. When the joy stick 12B is operated as illustrated in FIG. 4B, the Y-coordinate value of the target point 103 varies according to the longitudinal component value. When the joy stick 12A is operated as illustrated in FIG. 4C, the Z-coordinate value of the target point 103 varies according to the longitudinal component value. In this way, the position of the target point 103 in the three-dimensional space is set based on the operations on the independently operable joy sticks 12A and 12B. When the first operator releases the hands from the joy sticks 12A and 12B, the tilted joy sticks return to the initial position to stop the movement of the target point 103.

Figure 5A:
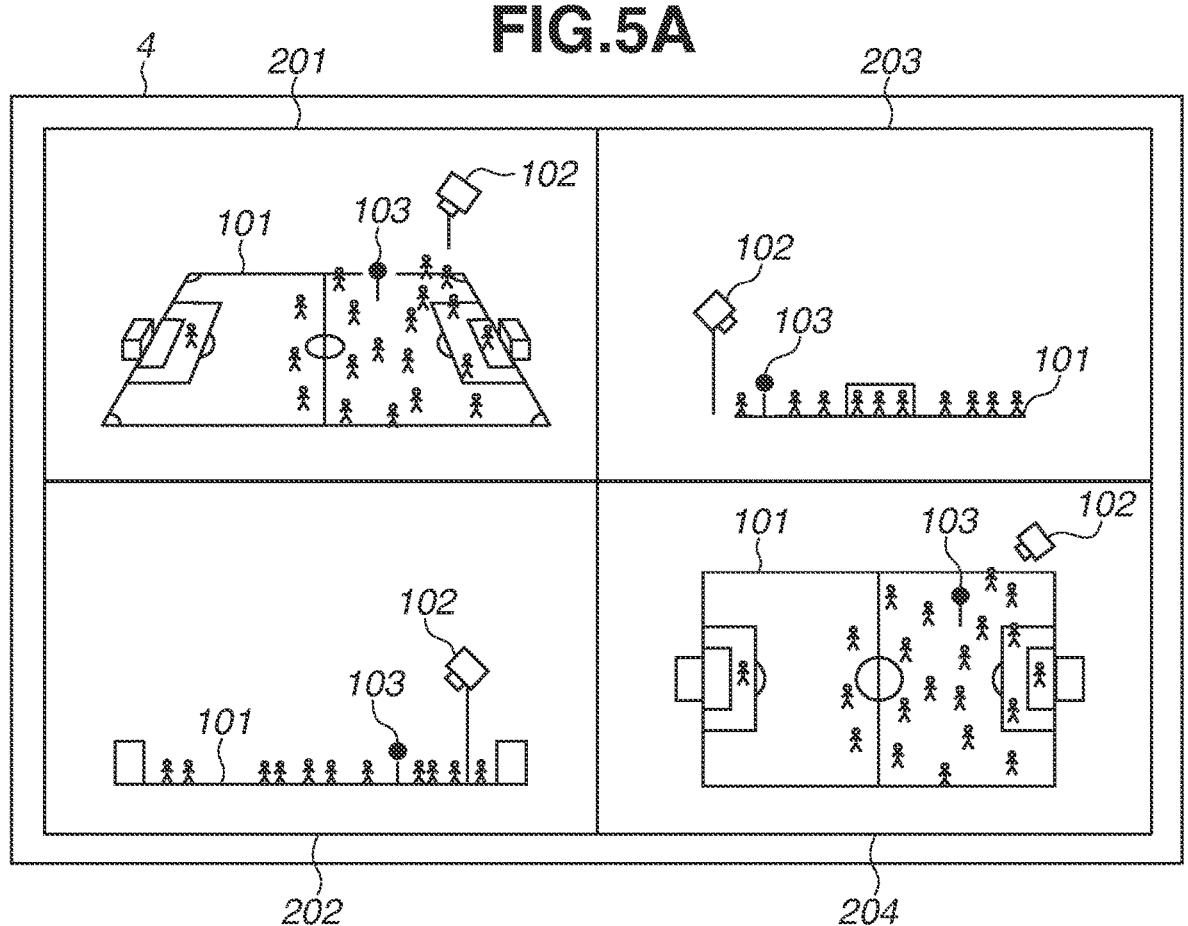
FIGS. 5A and 5B illustrate examples of display screens on a display unit.

FIG. 5A illustrates an example of a display screen displayed on the display unit 4. An image indicating the position of the set target point 103 is displayed on the display unit 4, enabling the first operator to operate the operation unit 1 while monitoring the display screen of the display unit 4 to move the target point 103. Display screens generated and displayed on the display unit 4 by the display control unit 33 include an overhead view image 201, a front view image 202, a side view image 203, and a plan view image 204 of a stadium, as illustrated in FIG. 5A. These images are generated by the image processing apparatus 9 based on captured images for each frame as virtual viewpoint images viewed from respective predetermined viewpoints, and are transmitted to the display control unit 33.

Therefore, the first operator can specify the three-dimensional position of the target point 103 while monitoring the ball and players captured in the virtual viewpoint images. Images representing the ball and players are not limited to the ones generated based on captured images but may be prestored images or predetermined icons.

The display control unit 33 superimposes the icon representing the three-dimensional position of the target point 103 corresponding to the operation on the operation unit 1 onto the generated overhead view image 201, front view image 202, side view image 203, and plan view image 204. Further, the icon representing the three-dimensional position of the virtual camera 102 obtained in processing (described below) may be superimposed. As a method for superimposing the icons, the image processing apparatus 9 may acquire the three-dimensional positions of the target point 103 and the virtual camera 102 on the three-dimensional space, and arrange the icons on the virtual viewpoint images. Alternatively, the display control unit 33 may calculate the two-dimensional positions of the target point 103 and the virtual camera 102 on the virtual viewpoint images, and arrange the icons on the virtual viewpoint images.

Figure 5B:
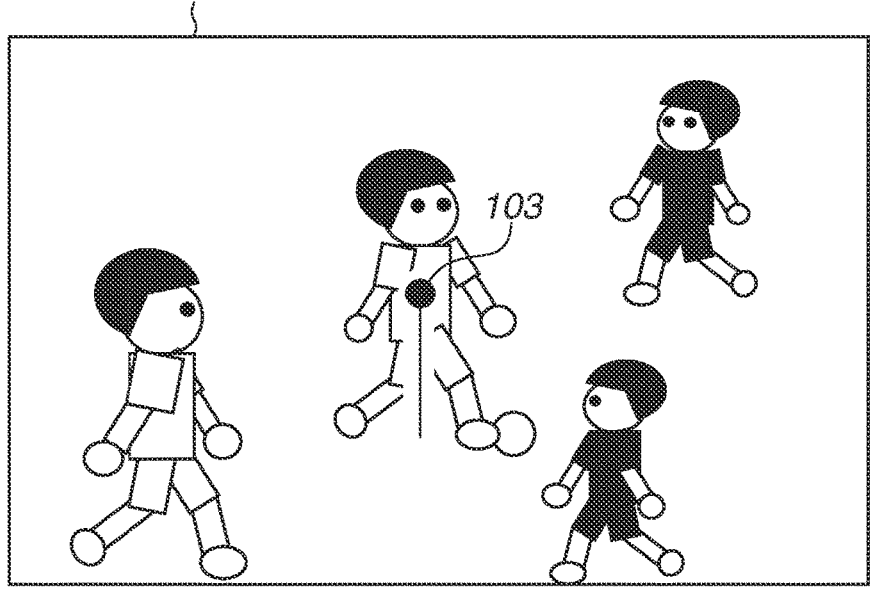

Referring to the example illustrated in FIG. 5A, the overhead view image 201, the front view image 202, the side view image 203, and the plan view image 204 are displayed in four division screens having the same area. However, a specific image can be increased or decreased in the display area or hidden through operations via operation buttons (not illustrated). To facilitate minute position specification operations, the display control unit 33 may display an enlarged view image 205 near the target point 103, as illustrated in FIG. 5B. The enlarged view image 205 illustrated in FIG. 5B is an enlarged version of the overhead view image 201. One image selected from the overhead view image 201, the front view image 202, the side view image 203, and the plan view image 204 may be enlarged through operations on operation buttons (not illustrated).

The enlarged view image 205 may be constantly displayed as apart of the display unit 4, or may be displayed when an enlarged display operation is performed through operations on operation buttons (not illustrated). For example, in a case where an enlarged display operation is performed on the overhead view image 201, the enlarged view image 205 may be displayed as it is at the display position of the overhead view image 201. Alternatively, the enlarged view image 205 may be displayed at the display position of other image (e.g., the side view image 203). Alternatively, the display area of each image may be reduced to allocate the display position of the enlarged view image 205. The display control unit 33 may scroll the region of the enlarged view image 205 with the movement of the target point 103 so that the target point 103 is constantly positioned at the center of the enlarged view image 205.

To update a large number of virtual viewpoint images for each frame, the image processing apparatus 9 requires high processing capability. Accordingly, to reduce the processing load, the virtual viewpoint images to be displayed as the overhead view image 201, the front view image 202, the side view image 203, and the plan view image 204 may provide a lower resolution than the virtual viewpoint image for monitoring. As described earlier, in a case where the display area of each diagram is made variable, the resolution may be made variable according to the display area. For the overhead view image 201, the front view image 202, the side view image 203, and the plan view image 204, the background is not generated for each frame but a pre-generated still image may be used, and only the foreground image (including players and the ball) may be generated for each frame. The foreground may be omitted for at least a part of the overhead view image 201, the front view image 202, the side view image 203, and the plan view image 204.

FIGS. 6A to 6L illustrate operations for changing the horizontal and vertical directions of the virtual camera 102 relative to the target point 103, the roll angle of the virtual camera 102, the distance between the target point 103 and the virtual camera 102, and the viewing angle of the virtual camera 102, by using the operation unit 2. When the operator tilts the lever of the joy stick 22A or 22B in a desired direction around 360 degrees, the joy stick 22A or 22B outputs the lateral component value and the longitudinal component value corresponding to the direction and amount of tilt. Further, when the lever is rotated centering on the lever shaft, the joy stick 22A or 22B outputs the rotation component value.

Figure 6A:
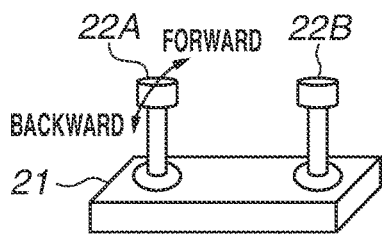
FIGS. 6A to 6L illustrate operations performed by using operation units.
Figure 6B:
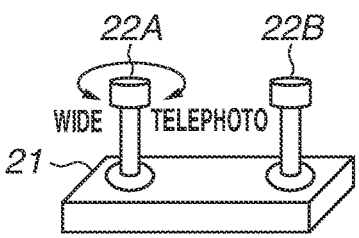
Figure 6C:
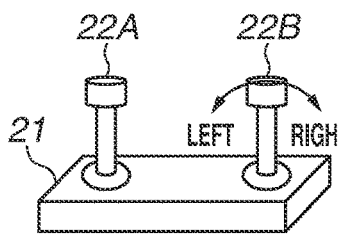
Figure 6D:
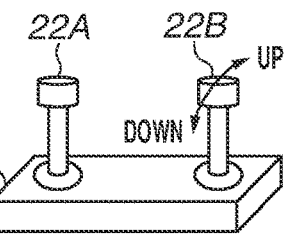
Figure 6E:
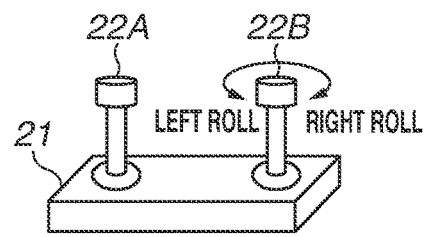
Figure 6F:
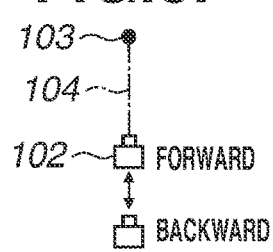
Figure 6G:
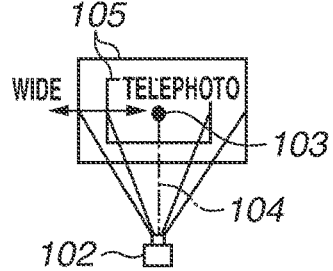

When the joystick 22A is operated as illustrated in FIG. 6A, the virtual camera 102 moves in the direction of the line of sight 104 of the virtual camera 102 as illustrated in FIG. 6F according to the longitudinal component value, thus varying the distance between the target point 103 and the virtual camera 102. When the joy stick 22A is operated as illustrated in FIG. 6B, the viewing angle of the virtual camera 102 varies as illustrated in FIG. 6G according to the rotation component value, thus changing the size of visual field 105 of the virtual camera 102.

Figure 6H:
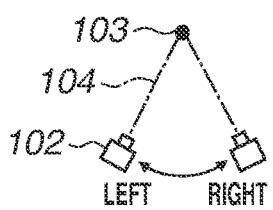
Figure 6I:
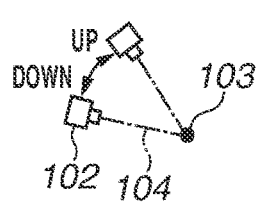

When the joy stick 22B is operated as illustrated in FIG. 6C, the horizontal direction of the virtual camera 102 relative to the target point 103 changes as illustrated in FIG. 6H according to the lateral component value. In this case, the viewpoint setting unit 32 of the information processing apparatus 3 controls the direction of the line of sight 104 of the virtual camera 102 to be oriented toward the target point 103. When the joy stick 22B is operated as illustrated in FIG. 6D, the vertical direction of the virtual camera 102 relative to the target point 103 changes as illustrated in FIG. 6I according to the longitudinal component value. In this case, the viewpoint setting unit 32 of the information processing apparatus 3 controls the direction of the line of sight 104 of the virtual camera 102 to be oriented toward the target point 103.

Figure 6J:
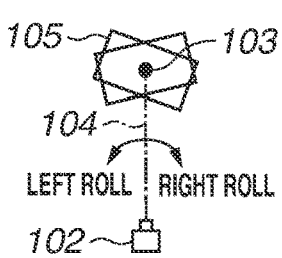

When the joy stick 22B is operated as illustrated in FIG. 6E, the roll angle of the virtual camera 102 changes as illustrated in FIG. 6J, and the inclination of the visual field 105 of the virtual camera 102 changes (the virtual camera 102 rotates about the line of sight 104) according to the rotation component value. When the operator releases the hands from the joy sticks 22A and 22B, the tilted joy sticks return to the initial position to stop the change in the direction, roll angle, distance, and viewing angle of the virtual camera 102.

In this way, the three-dimensional position of the virtual camera 102 relative to the target point 103, the orientation of the virtual camera 102 in the pan, tilt, and roll directions, and the viewing angle of the virtual camera 102 are set based on the operations on the independently operable joy sticks 22A and 22B. The viewpoint setting unit 32 sets the position and orientation of the virtual camera 102 relative to the target point 103 in an associated manner so that the target point 103 is positioned in a predetermined direction (e.g., in the line-of-sight direction according to the orientation of the virtual camera 102) when viewed from the position of the virtual camera 102. This makes it possible to change the position of the virtual camera 102 without the target point 103 deviating from the visual field of the virtual camera 102.

Figure 7:
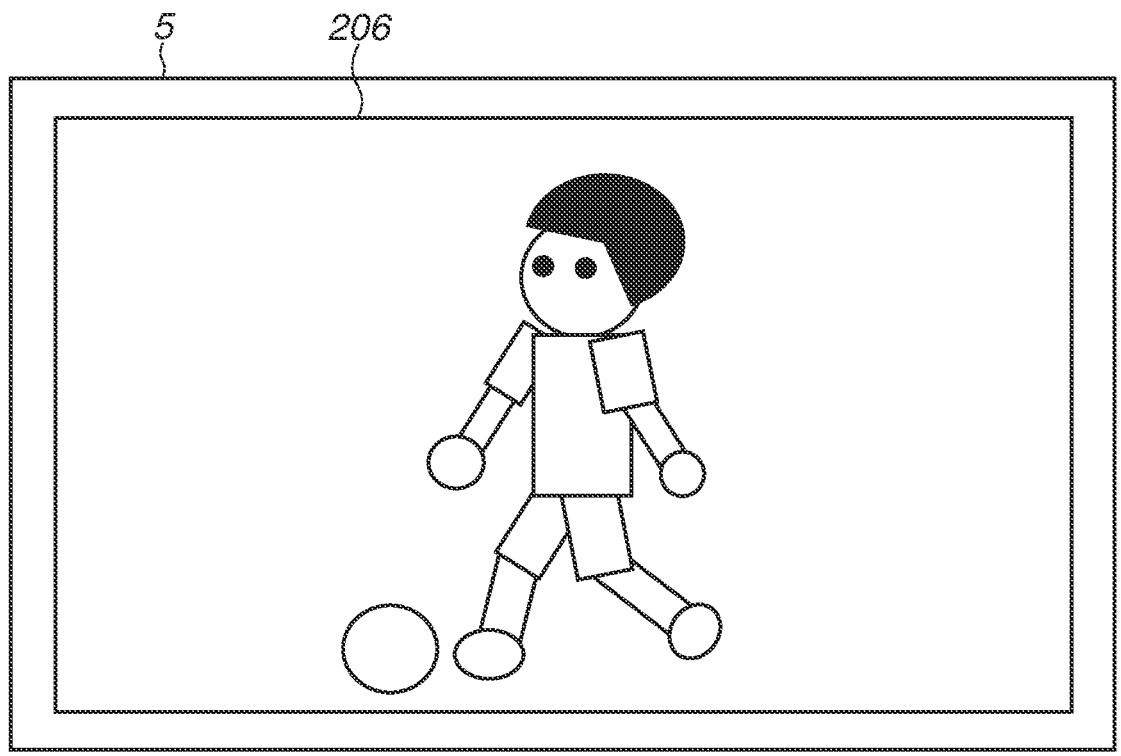
FIG. 7 illustrates another example of a display screen on the display unit.

FIG. 7 illustrates an example of a display screen displayed on the display unit 5. The display unit 5 displays an image corresponding to the set position and orientation of the virtual camera 102. A second operator operates the operation unit 2 while monitoring the display screen of the display unit 5 to control the direction, roll angle, distance, and viewing angle of the virtual camera 102 relative to the target point 103. The display screen generated and displayed on the display unit 5 by the display control unit 33 includes a virtual viewpoint image 206 corresponding to the virtual viewpoint set based on the operations on the operation units 1 and 2, as illustrated in FIG. 7. However, the image according to the position and orientation of the virtual camera 102 displayed on the display unit 5 is not limited to the virtual viewpoint image 206, but may be an image of icons indicating the position and orientation of the virtual camera 102.

Note that FIGS. 6F, 6G, 6H, 6I and 6J illustrate the change in the position and orientation of the virtual camera 102 relative to the target point 103. More specifically, the movement of the virtual camera 102 in the three-dimensional space when the operation units 1 and 2 are operated at the same time is obtained by combining the movements of the target point 103 illustrated in FIGS. 4A to 4D with the movements of the virtual camera 102 relative to the target point 103 illustrated in FIGS. 6A to 6L.

According to the present exemplary embodiment, if the operations on the target point 103 (described above with reference to FIGS. 4A to 4D) and the operations on the virtual camera 102 relative to the target point 103 (described above with reference to FIGS. 6A to 6L) are shared by two different operators, the operations by the two operators can be simplified.

For example, assume a case of changing the direction in which a moving subject (e.g., a player or the ball) is viewed (the position of the virtual viewpoint relative to the subject) while tracking the moving subject. Unlike the present exemplary embodiment, in a case where the first operator operates the position of the virtual camera 102 and the second operator operates the orientation of the virtual camera 102, the second operator operates the orientation of the virtual camera 102 while predicting or checking the movement of the virtual camera 102 operated by the first operator. Likewise, the first operator moves the virtual camera 102 while predicting or checking the change in the orientation of the virtual camera 102 operated by the second operator. If the first and the second operators operate the virtual camera 102 while predicting or checking the mutual operations, the prediction may fail resulting in an unintended result. If the first and the second operators operate the virtual camera 102 after checking the result of the operation by the counterpart, an operation time lag may occur.

On the other hand, the operation sharing according to the present exemplary embodiment enables the first operator to concentrate on the tracking of the subject, and enables the second operator to concentrate on the changing of the viewing direction of the subject. Accordingly, the second operator does not need to take notice of the movement of the subject, and the first operator does not need to take notice of notice the viewing direction of the subject. This enables the first and the second operators to smoothly obtain an intended operation result with no time lag, without being affected by each other's operations.

An example case where the distance between the virtual camera 102 and the subject and the viewing angle of the virtual camera 102 are operated to adjust the perspective will be considered below. If the viewing angle is widened by bringing the virtual camera 102 close to the subject, a close subject is captured in a large size and a far subject is captured in a small size, and therefore the perspective increases. On the contrary, if the viewpoint is kept away from a subject to narrow the viewing angle, the perspective decreases. More specifically, how the back of the target subject is captured can be changed while maintaining the size of the target subject in the virtual viewpoint image approximately constant. Unlike the present exemplary embodiment, in a case where the first operator operates the position of the virtual camera 102 and the second operator operates the viewing angle of the virtual camera 102, the second operator operates the viewing angle while predicting or checking the change in the distance between the virtual camera 102 and the subject corresponding to the operation by the first operator. Likewise, the first operator operates the position of the virtual camera 102 while predicting or checking the change in the viewing angle operated by the second operator. In this case, like the previous example, the prediction may fail resulting in an unintended result, or an operation time lag may occur due to checking of the operation result.

On the other hand, the operation sharing according to the present exemplary embodiment enables the second operator to operate both the distance between the virtual camera 102 and the target point 103 and the viewing angle of the virtual camera 102, thus achieving the desired perspective. More specifically, the second operator can smoothly obtain an intended operation result with no time lag, without being affected by the operation of the first operator. However, the control system 6 needs to set at least the position and orientation of the virtual camera 102 and does not need to have a function of setting the viewing angle of the virtual camera 102.

The correspondence between the user operations illustrated in FIGS. 4A to 4D and the operations of the virtual camera 102 illustrated in 6A to 6L are to be considered as illustrative. Each joy stick may be assigned operations different from the above-described operations. For example, the joy stick operations assigned to the right and left hands may be exchanged, and some of the operations assigned to the left hand (or the right hand) may be assigned to the right hand (or the left hand). Longitudinal component operations, lateral component operations, and rotational component operations of the joy sticks may be exchanged. Further, the correspondence between the user operations and the virtual camera operations may be arbitrarily set according to the preference and habituation of the operators.

For example, in a case of an operator who wants to "tilt the joy stick in the direction in which the virtual camera 102 is to be moved", when moving the virtual camera 102 to the left in the operation illustrated in FIG. 6H, it is natural for the operator to tilt the joy stick to the left. Meanwhile, in a case of an operator who wants to "tilt the joy stick in the direction in which the virtual camera 102 is to be oriented", since the orientation of the virtual camera 102 changes to the right in association with the movement of the virtual camera 102 to the left, it is natural for the operator to tilt the joy stick to the right. Changing the correspondence between the user operations and the virtual camera operations in this way makes it easier for different operators to perform operations.

Figure 6K:
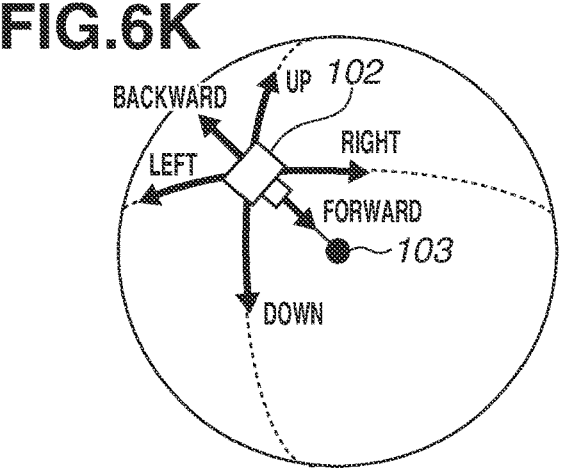
Figure 6L:
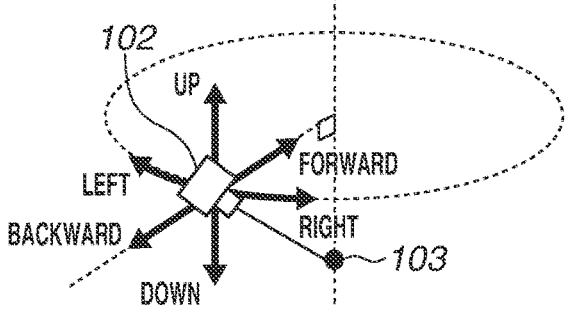

When the operator performs an operation for moving the virtual camera 102 in the longitudinal direction, the virtual camera 102 may be moved on a straight line from the virtual camera 102 to the target point 103, as illustrated in FIG. 6K. Alternatively, the virtual camera 102 may be moved on a horizontal plane where the relative height from the target point 103 is constant, as illustrated in FIG. 6L. When the operator performs an operation for moving the virtual camera 102 in the lateral direction, the virtual camera 102 may be moved on a sphere centering on the target point 103, as illustrated in FIG. 6K. Alternatively, the virtual camera 102 may be moved on the horizontal plane where the relative height from the target point 103 is constant, as illustrated in FIG. 6L. When the operator performs an operation for moving the virtual camera 102 in the vertical direction, the virtual camera 102 may be moved on the sphere centering on the target point 103, as illustrated in FIG. 6K. Alternatively, the virtual camera 102 may be moved on the straight line perpendicular to the ground, as illustrated in FIG. 6L. Natural operations for the operators are enabled by changing the correspondence between the user operations and the virtual camera operations according to the preference and habituation of the operators.

Screen displays illustrated in FIGS. 5A, 5B, and 7 are to be considered as illustrative, images displayed on the display units 4 and 5 are not limited thereto. For example, the display unit 4 may display the virtual viewpoint image 206 illustrated in FIG. 7. The display unit 5 may display the overhead view image 201, the front view image 202, the side view image 203, and the plan view image 204 illustrated in FIGS. 5A and 5B. The display units 4 and 5 may display other various images and information.

[Operation Flow]

Figure 8:
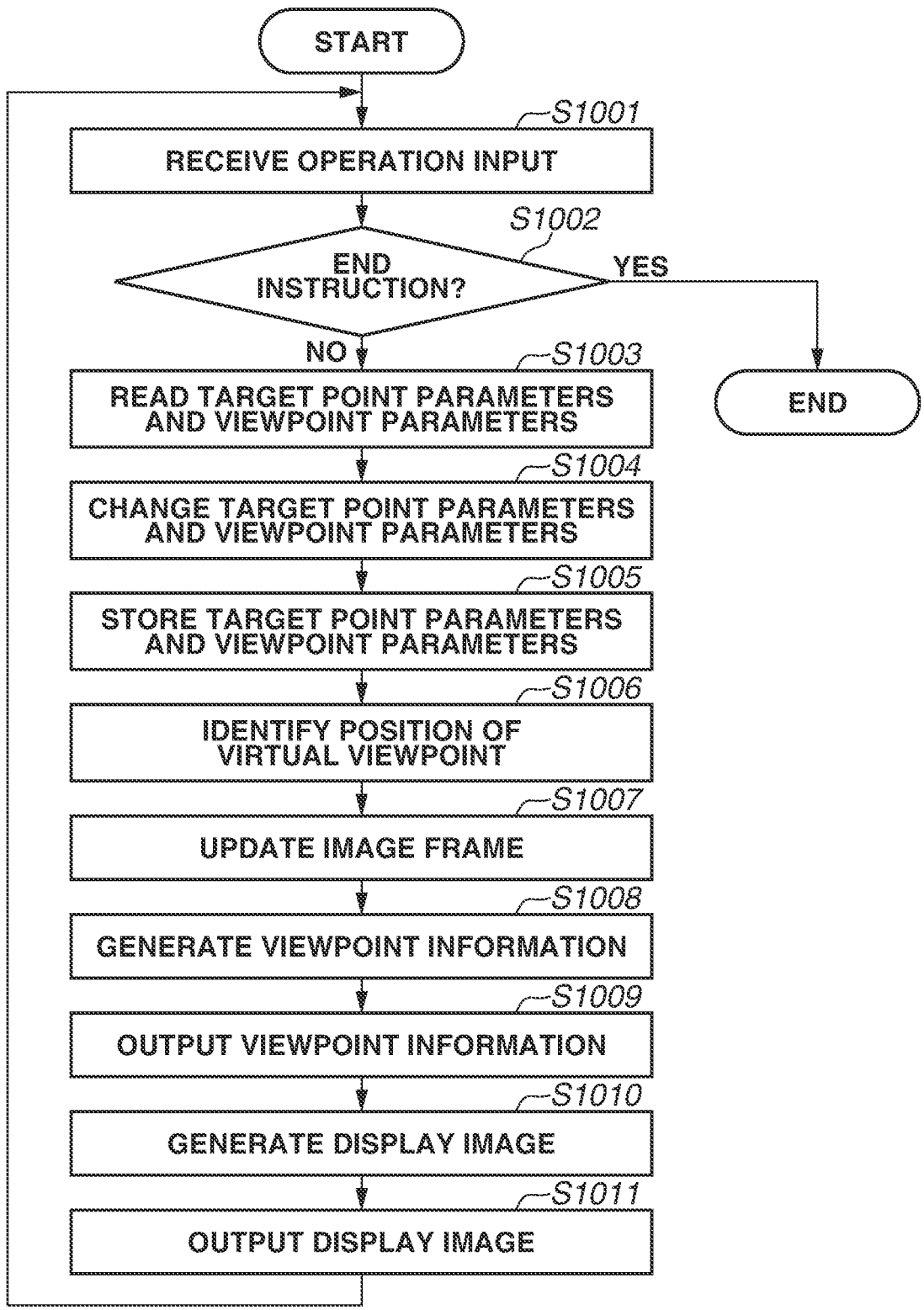
FIG. 8 is a flowchart illustrating an example of an operation of an information processing apparatus.

Operations of the information processing apparatus 3 will be described below with reference to the flowchart illustrated in FIG. 8. Processing illustrated in FIG. 8 is implemented when the CPU 301 of the information processing apparatus 3 loads a program stored in the ROM 302 into the RAM 303 and then executes the program. At least part of the processing illustrated in FIG. 8 may be implemented by one or a plurality of dedicated hardware components different from the CPU 301. The processing illustrated in FIG. 8 is started at the timing when the image processing apparatus 9 and the information processing apparatus 3 are connected and an instruction for performing a viewpoint operation related to the generation of a virtual viewpoint image is input to the information processing apparatus 3. However, the timing for starting the processing illustrated in FIG. 8 is not limited thereto. The processing loop from step S1001 to S1011 illustrated in FIG. 8 is processed once for each frame of the virtual viewpoint image output as a moving image from the image processing unit 7.

In step S1001, the operation input unit 31 receives inputs corresponding to the user operations on the operation units 1 and 2, and outputs an operation instruction to the viewpoint setting unit 32. In a case where operation units other than the operation units 1 and 2 are connected to the information processing apparatus 3, inputs from these operation units are also processed. In step S1002, the viewpoint setting unit 32 determines whether the above-described operation instruction is an ending instruction for ending a viewpoint operation. If the input operation instruction is an ending instruction (YES in step S1002), the processing exits the flowchart illustrated in FIG. 8. On the other hand, if the input operation instruction is not an ending instruction (NO in step S1002), the processing proceeds to S1003. For example, in a case where the input operation instruction is an instruction related to the operation on the target point 103 or the virtual camera 102 or an instruction indicating that no operation was performed on the operation units 1 and 2 (NO in step S1002), the processing proceeds to step S1003.

In step S1003, the viewpoint setting unit 32 reads the current values of target point parameters for identifying the position of the target point 103 and viewpoint parameters for identifying the relative position, orientation, and viewing angle of the virtual viewpoint relative to the target point 103 from the RAM 303. When the processing for the first frame is performed, predetermined initial values or final values at the time of the last operation are read as current values. When the processing for the second and subsequent frames is performed, the values stored in step S1005 in the processing for the previous frame are read as current values.

The target point parameters indicate the position of the target point 103, for example, the X-, Y-, and Z-coordinate values of the position of the target point 103 in the three-dimensional space. On the other hand, the viewpoint parameters indicate at least the position and orientation of the virtual camera 102 relative to the target point 103. For example, the viewpoint parameters indicate the horizontal and vertical directions of the virtual camera 102 relative to the target point 103, the distance between the target point 103 and the virtual camera 102, and the viewing angle of the virtual camera 102.

In step S1004, the viewpoint setting unit 32 changes the target parameters and viewpoint parameters based on the target parameters and viewpoint parameters read in step S1003 and the above-described operation instruction corresponding to the operation input received in step S1001. More specifically, the viewpoint setting unit 32 changes the target parameters based on the input corresponding to the operation on the operation unit 1 and changes the viewpoint parameters based on the input corresponding to the operation on the operation unit 2. The method for changing parameters is as described above with reference to FIGS. 4A to 4D and 6A to 6L. In step S1005, the viewpoint setting unit 32 stores the changed target point parameters and viewpoint parameters as updated new current values in the RAM 303. When no user operation is performed on the operation units 1 and 2, the processing in step S1004 is not performed, and the target point parameters and viewpoint parameters read in step S1003 are stored as new current values.

In step S1006, the viewpoint setting unit 32 identifies the three-dimensional position of the virtual viewpoint in the three-dimensional space based on the latest target point parameters and viewpoint parameters. More specifically, the viewpoint setting unit 32 identifies not the position of the virtual camera 102 relative to the target point 103 but the absolute position of the virtual camera 102 represented by a similar coordinate system to the position coordinates of the target point 103.

In step S1007, the viewpoint setting unit 32 updates the frame of the material data used to generate a virtual viewpoint image (e.g., the frame of the captured image). The image processing system 10 may generate a virtual viewpoint image as a live video image while performing image capturing through the imaging apparatuses 8. Alternatively, the image processing system 10 may store captured images and the material data generated from the captured images in the storage unit 72 and generate a virtual viewpoint image as a replay video image after completion of image capturing. When reproducing a live video image and a replay video image in a normal playback mode, the CPU 301 advances the material data frame by one in each progress of the frame of the output virtual viewpoint image. On the other hand, when reproducing a replay video image in a slow playback mode, the CPU 301 advances the material data frame by one in each progress of a plurality of frames of the output virtual viewpoint image. When reproducing a replay video image in which a captured image is suspended and the virtual viewpoint is moved, the CPU 301 advances only the frame of the output virtual viewpoint image and stops updating the material data frame.

In step S1008, the viewpoint setting unit 32 generates viewpoint information having a predetermined format including information indicated by the frame number, the three-dimensional position of the virtual viewpoint, the orientation of the virtual viewpoint, and the viewing angle of the virtual viewpoint. In step S1009, the information processing apparatus 3 outputs stationary viewpoint information to the image processing apparatus 9 via the communication I/F 307. The image processing apparatus 9 generates a virtual viewpoint image based on the viewpoint information acquired from the information processing apparatus 3 and the material data stored in the storage unit 72, and outputs the generated virtual viewpoint image to the information processing apparatus 3. The image processing apparatus 9 may output the generated virtual viewpoint image to the storage unit 72 and the outside of the image processing system 10.

In step S1010, the display control unit 33 generates display images to be displayed on the display units 4 and 5. The display images to be generated may include the virtual viewpoint image generated by the image processing apparatus 9. The first and the second operators perform subsequent operations while monitoring the screens displayed on the display units 4 and 5, respectively. Then, the processing returns to step S1001. The information processing apparatus 3 performs processing for a new input operation.

Modification

Figure 9:
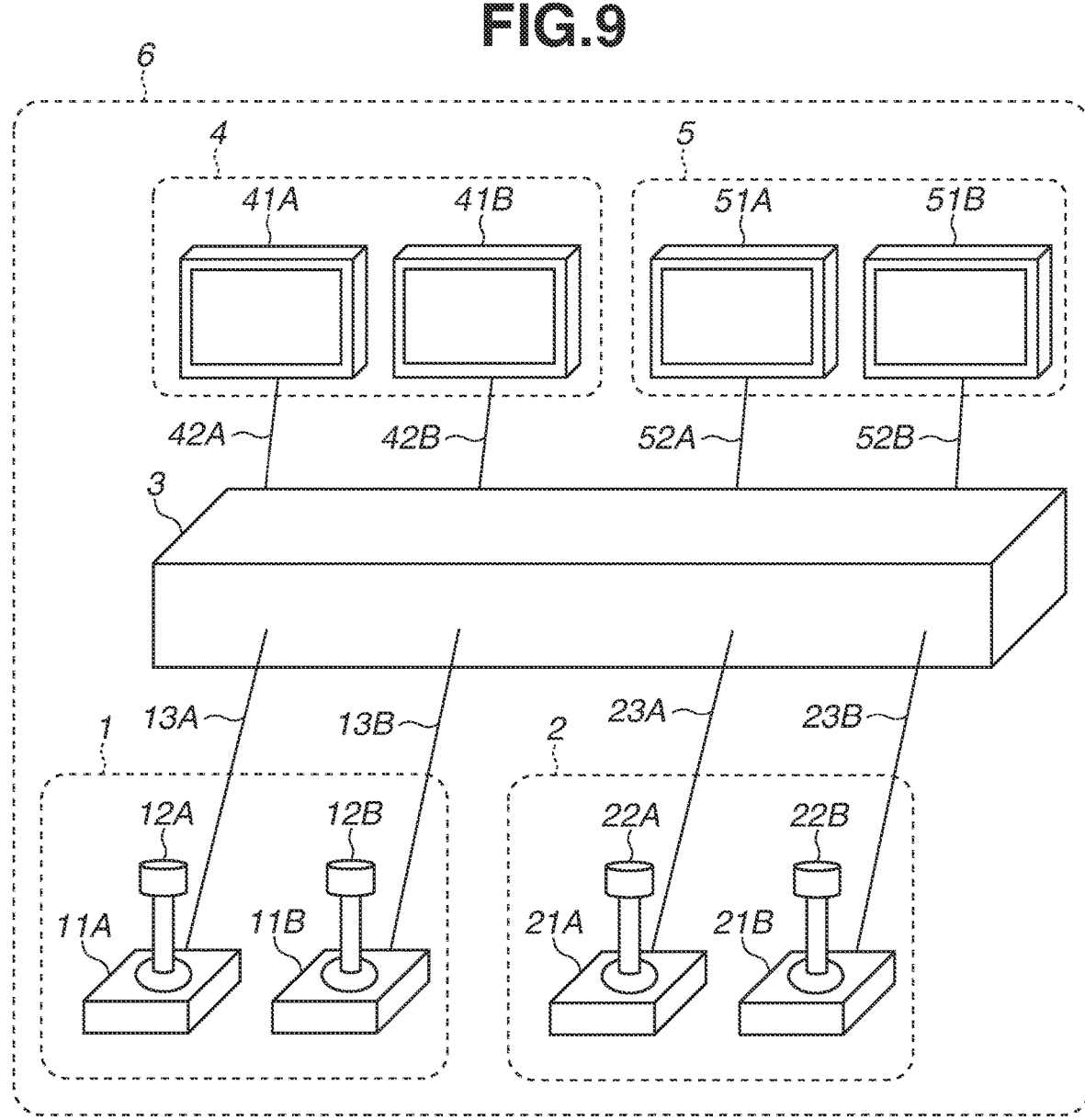
FIG. 9 illustrates another example of a device configuration of the control system.

The device configuration illustrated in FIG. 3 is considered as illustrative, and the configuration of the control system 6 is not limited thereto. FIG. 9 illustrates a modification of the control system 6. The operation unit 1 includes the joy stick 12A attached to a console 11A, and the joy stick 12B attached to a console 11B. Based on the operation on the joy stick 12A, an operation signal is generated by the electric circuit of the console 11A. The operation signal is transmitted to the information processing apparatus 3 via an operation signal cable 13A. Based on the operation on the joy stick 12B, an operation signal is generated by the electric circuit of the console 11B. The operation signal is transmitted to the information processing apparatus 3 via an operation signal cable 13B. Like the operation unit 1, the operation unit 2 also includes the joy stick 22A attached to a console 21A, and the joy stick 22B attached to a console 21B. The consoles 21A and 21B are connected to operation signal cables 23A and 23B, respectively.

The display unit 4 includes a set of independent display apparatuses 41A and 41B. Video image signals output from the information processing apparatus 3 are transmitted to the display apparatuses 41A and 41B via image signal cables 42A and 42B, respectively. Like the display unit 4, the display unit 5 includes a display apparatus 51A connected with an image signal cable 52A, and a display apparatus 51B connected with an image signal cable 52B.

Figure 10:
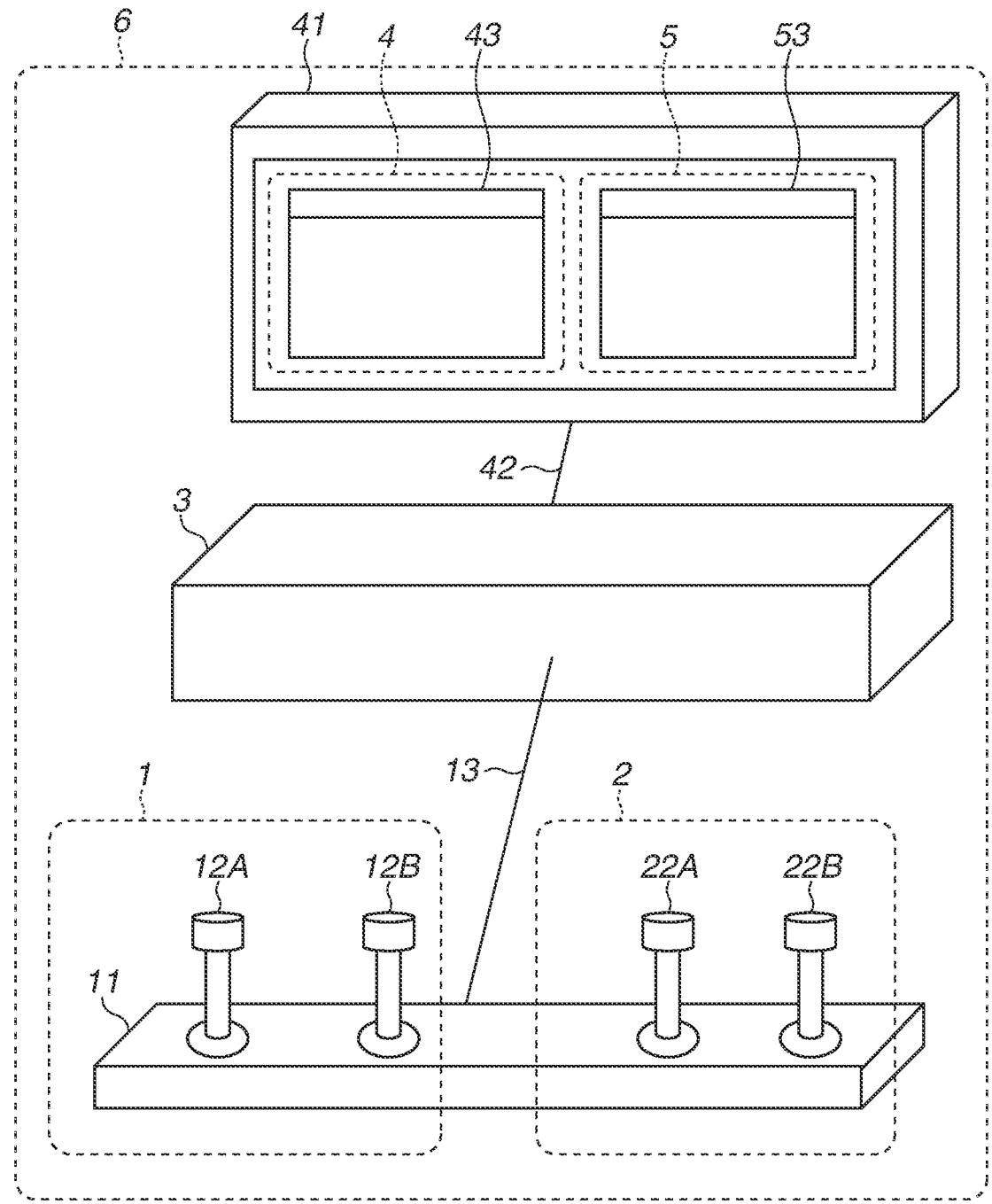
FIG. 10 illustrates a still another example of a device configuration of the control system.

FIG. 10 illustrates another modification in which the joy sticks 12A and 12B of the operation unit 1 and the joy sticks 22A and 22B of the operation unit 2 are attached to one console 11. Based on operations on each joy stick, an operation signal is generated by the electric circuit of the console 11. The operation signal is transmitted to the information processing apparatus 3 via an operation signal cable 13. The display apparatus 41 illustrated in FIG. 10 displays a window 43 as an area equivalent to the display unit 4, and a window 53 as an area equivalent to the display unit 5. The image signal from the information processing apparatus 3 is transmitted to the display apparatus 41 via an image signal cable 42.

Each of the joy sticks included in the control system 6 needs to enable at least one-dimensional input. For example, the joy stick 12A illustrated in FIGS. 4A to 4D may be a one-dimensional joy stick which enables only the input of the longitudinal component. A multidimensional joy stick provided with other movable members, and operation devices (including a keyboard, a mouse, and a touch panel) other than joy sticks are also usable. Not only manually operated operation devices but also operation devices operated by using the head, line of sight, voice, foot, and other body parts are also usable.

A touch panel integrally formed with the display unit 4 may be used as the operation unit 1, and a touch panel integrally formed with the display unit 5 may be used as the operation unit 2. For example, when using a touch panel as the operation unit 1, the X- and Y-coordinates may be operated by using the touch panel and the Z-coordinate may be operated by using a joy stick or button. The operation unit 1 or 2 may be provided with a button for specifying a predetermined position (e.g., the center mark, penalty marks, and goal centers in a soccer field, or the pitcher's mound and home plate in a baseball field) as the target point 103. The operation units 1 and 2 do not need to be completely independent of each other but may be configured to be operated by different operators at the same time.

A virtual viewpoint image generated by the image processing apparatus 9 may be an image generated based on a three-dimensional model generated, for example, by CAD instead of using captured images. Alternatively, a virtual viewpoint image generated by the image processing apparatus 9 may be an image including a three-dimensional model generated based on captured images and a three-dimensional model generated by CAD.

As discussed above, the information processing apparatus 3 according to the present exemplary embodiment sets the position and orientation of a virtual viewpoint corresponding to a virtual viewpoint image. More specifically, the information processing apparatus 3 sets a target position to be included in the visual field according to the virtual viewpoint based on the operation on the operation unit 1, and sets the position and orientation of the virtual viewpoint relative to the target position based on the operation on the operation unit 2. Such a configuration makes it easier, for example, to operate the virtual viewpoint to change the viewing direction of target position while including the target position in the visual field according to the virtual viewpoint. This enables improving the convenience of operations related to the setting of the virtual viewpoint corresponding to the virtual viewpoint image.

The information processing apparatus 3 according to the present exemplary embodiment sets the target position based on the operation on the operation unit 1 by the first operator, and sets the position and orientation of the virtual viewpoint relative to the target position based on the operation on the operation unit 2 by the second operator. Thus, operations by two operators can be simplified if the operations on the target point 103 and the operations on the virtual viewpoint relative to the target point 103 are shared to two different operators. This enables the operators to smoothly obtain an intended operation result without being affected by each other's operations.

[Controlling a Plurality of Virtual Viewpoints]

Figure 11:
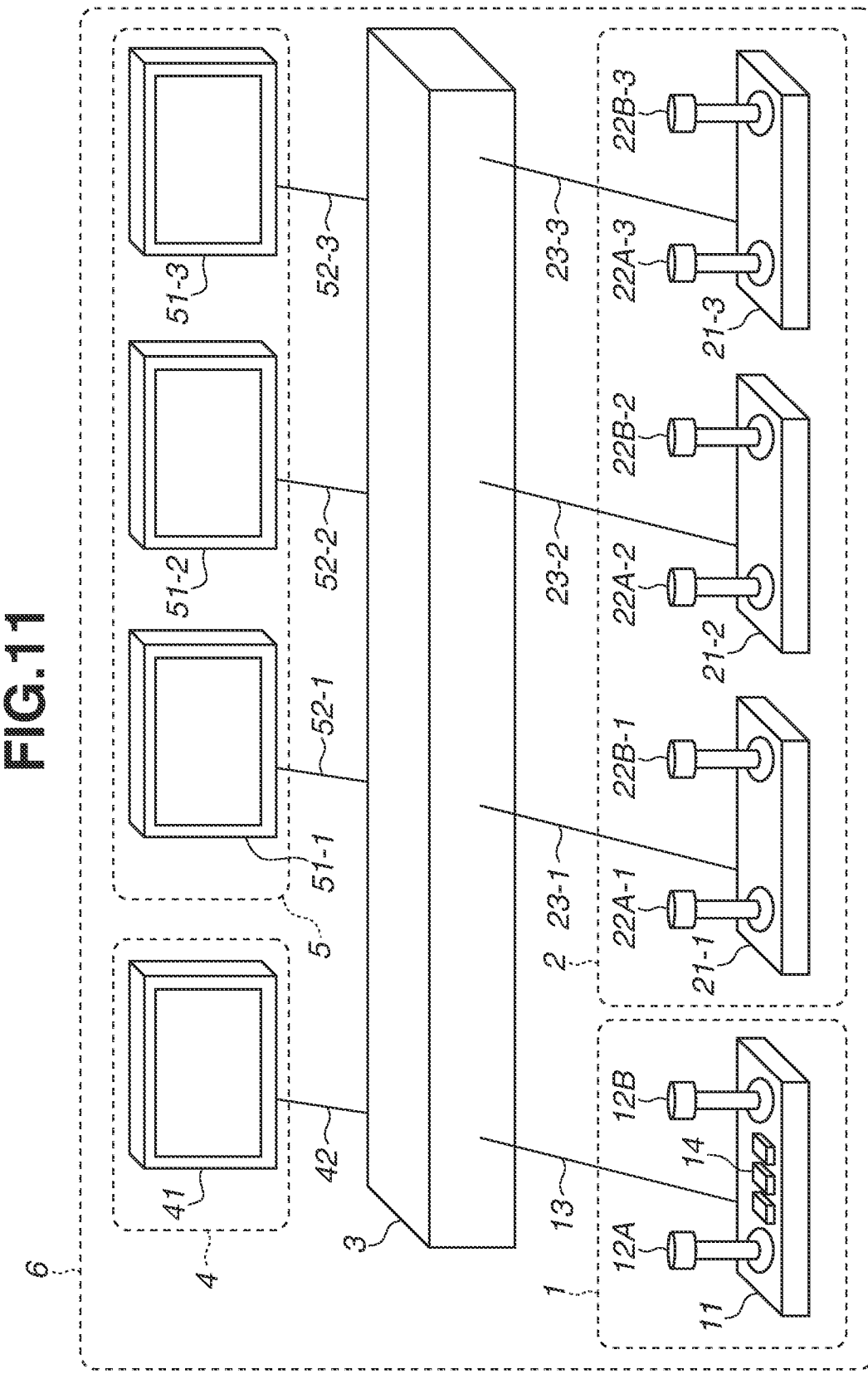
FIG. 11 illustrates a still another example of a device configuration of the control system.

The following describes an example of the control system 6 which enables setting a plurality of virtual cameras 102 oriented toward the same target point 103 to generate a plurality of virtual viewpoint images. FIG. 11 illustrates an example of a specific device configuration of the control system 6. Referring to the example illustrated in FIG. 11, the operation unit 2 including three independent consoles 21-1, 21-2, and 21-3 is associated with one operation unit 1.

Three different virtual viewpoint images are generated by controlling three virtual cameras 102 at the same time by using the three different consoles with reference to one target point 103 set by using the operation unit 1. More specifically, the target point 103 set by using the operation unit 1 is included in all of the visual fields of the three virtual cameras 102 corresponding to the three virtual viewpoint images. The position and orientation of each virtual camera 102 relative to the target point 103 are set based on the operation on the console corresponding to each virtual camera 102. The number of independent operation devices (e.g., consoles) included in the operation unit 2 is not limited to three but may be four or more.

Figure 12:
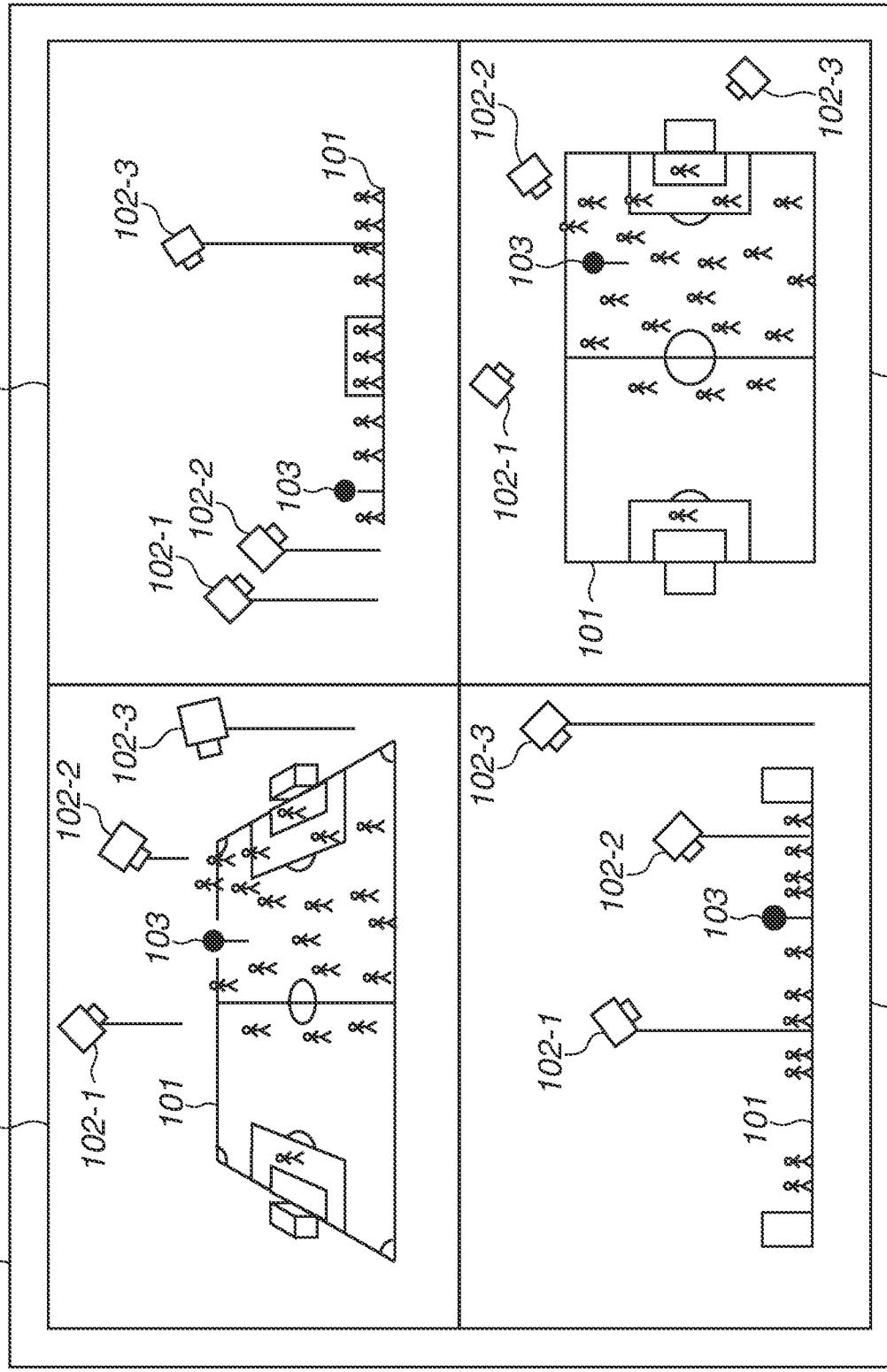
FIG. 12 illustrates still another example of a display screen on the display unit.

FIG. 12 illustrates examples of the overhead view image 201, the front view image 202, the side view image 203, and the plan view image 204 displayed on the display unit 4. Since three virtual cameras 102 are set when the control system 6 illustrated in FIG. 11 is used, three different icons indicating the three virtual cameras 102 are displayed in each image illustrated in FIG. 12. A virtual camera 102-1 is operated by using the console 21-1, a virtual camera 102-2 is operated by using the console 21-2, and a virtual camera 102-3 is operated by using a console 21-3. In the display screens of the display unit 4, icons with different colors, symbols, or numbers may be displayed to identify different virtual cameras 102.

In a case where a number of virtual cameras 102 are set, the display screen becomes complicated and therefore icons of the virtual cameras 102 may not be displayed. Alternatively, buttons 14 for selecting a specific virtual camera 102 may be provided on the operation unit 1, and only the icon of a selected virtual camera 102 may be displayed. The buttons 14 may not be physical buttons as illustrated in FIG. 11 but may be included in the GUI displayed on the display unit 4. The buttons 14 may be operated by using a keyboard, mouse, and touch panel for operating the GUI.

Figure 13A:
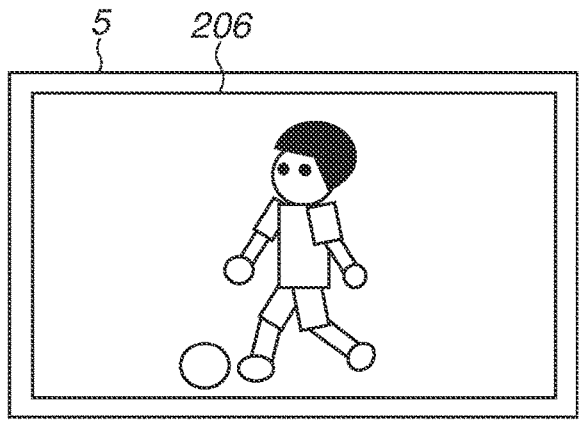
FIGS. 13A to 13C illustrate other examples of display screens on the display unit.
Figure 13B:
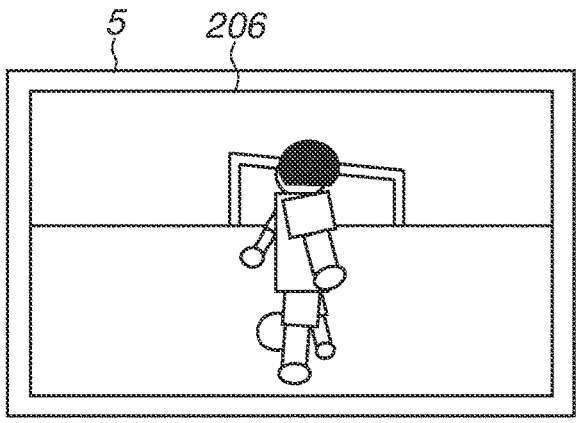
Figure 13C:
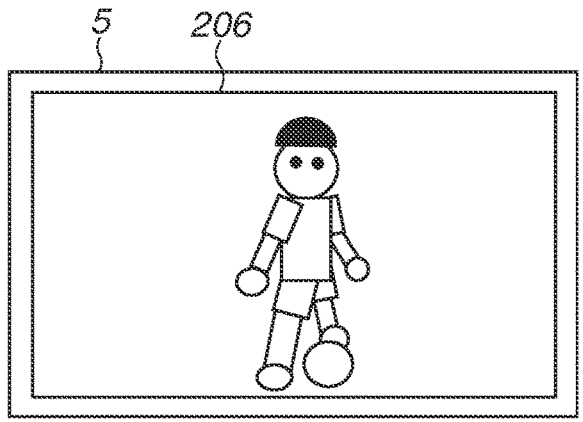

In a case where the plurality of virtual cameras 102 are controlled at the same time in this way, the operation input unit 31 parallelly processes the three operation signals input from the operation unit 2. The viewpoint setting unit 32 parallelly generates three pieces of viewpoint information corresponding to the three virtual cameras 102. In this case, the operation signal from the operation unit 1 is commonly used. The image processing apparatus 9 parallelly generates three virtual viewpoint images based on each piece of the viewpoint information. The display control unit 33 generates the image to be displayed on the display unit 4, and further parallelly generates the images to be displayed on the display apparatuses 51-1, 51-2, and 51-3 of the display unit 5. FIGS. 13A, 13B, and 13C illustrate examples of screens on the three display apparatuses 51-1, 51-2, and 51-3 of the display unit 5, in which three virtual viewpoint images 206 corresponding to the three virtual cameras 102 are displayed.

The above-described configuration makes it possible to generate a plurality of virtual viewpoint images corresponding to a plurality of virtual viewpoints oriented toward one target point. Since the number of operators when controlling a plurality of virtual viewpoints can be reduced, making it possible to reduce trouble and cost of generating virtual viewpoint images. For example, in a case where one virtual camera 102 is operated by two operators, 2*N operators (e.g., 10 operators when N=5) perform operations to control N virtual cameras 102. On the other hand, according to the configuration described above with reference to FIGS. 11, 12 and 13A to 13C, 1+N operators (e.g., 6 operators when N=5) need to perform operation to generate N virtual viewpoint images. The larger N, the larger the advantage of reducing trouble and cost in the above-described configuration.

By using M sets of the operation unit 1 having one operation device and the operation unit 2 having N independent operation devices, N virtual viewpoints can be controlled simultaneously for each of M target points.

[Controlling a Plurality of Target Points]

Figure 14:
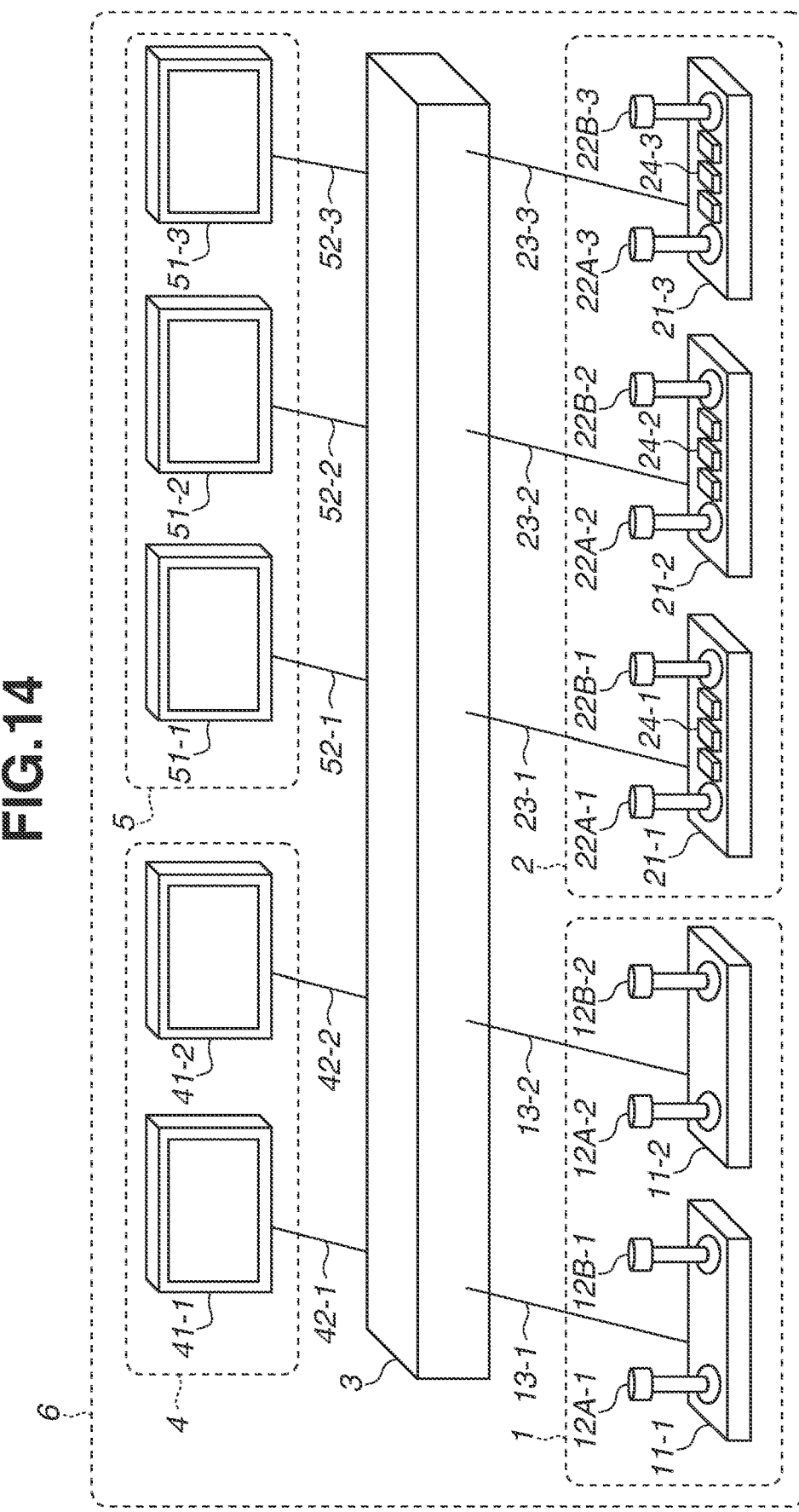
FIG. 14 illustrates still another example of a device configuration of the control system.

The following describes an example of the control system 6 including the operation unit 1 having a plurality of independent operation devices (e.g., consoles) to enable setting a plurality of target points 103. FIG. 14 illustrates an example of a specific device configuration of the control system 6. In the example illustrated in FIG. 14, the operation unit 1 includes consoles 11-1 and 11-2, and the operation unit 2 includes consoles 21-1, 21-2, and 21-3. However, the number of independent operation devices included in each of the operation units 1 and 2 is not limited thereto.

A plurality of target points 103 is set based on the operations on the plurality of consoles included in the operation unit 1. The position and orientation of the virtual camera 102 relative to a selected target point 103 from among the plurality of target points 103 are set based on the operation on each console included in the operation unit 2. Each console included in the operation unit 2 is provided with buttons 24 for selecting a specific console included in the operation unit 1 to change the correspondence between the consoles included in the operation unit 1 and the consoles included in the operation unit 2. The buttons 24 may not necessarily be physical buttons but may be included in a GUI displayed on the display unit 5. The buttons 24 may be operated by using a keyboard, mouse, and touch panel for operating the GUI.

The viewpoint setting unit 32 parallelly generates viewpoint information corresponding to the three virtual cameras 102 controlled by using the three consoles included in the operation unit 2. Each virtual camera 102 is controlled with reference to the target point 103 controlled by using the console of the operation unit 1 associated with each console of the operation unit 2. The image processing apparatus 9 parallelly generates three virtual viewpoint images based on the viewpoint information. The display control unit 33 parallelly generates images to be displayed on the display apparatuses 41-1 and 41-2 included in the display unit 4, and display apparatuses 51-1, 51-2, and 51-3 included in the display unit 5.

Figure 15:
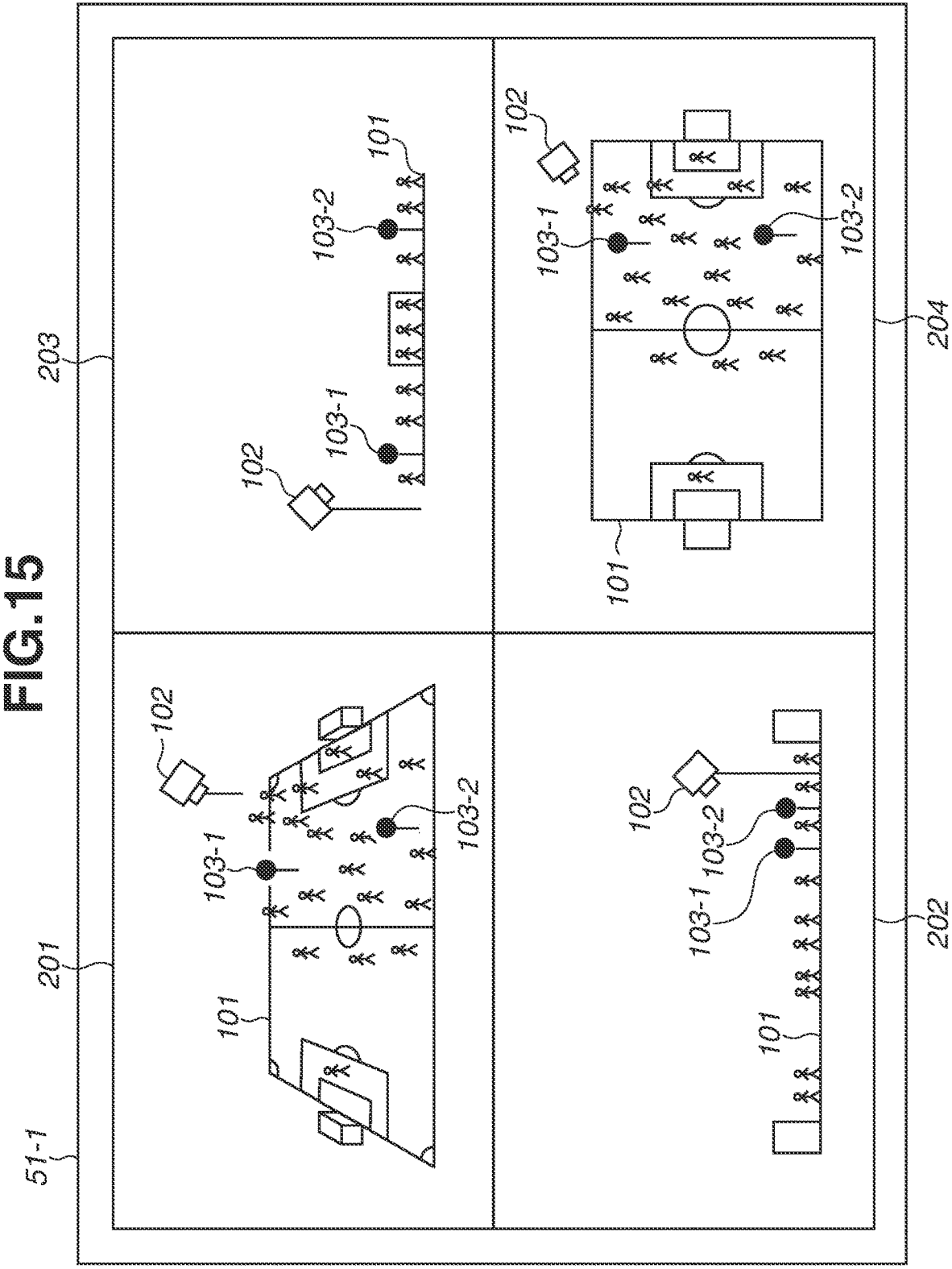
FIG. 15 illustrates still another example of a display screen on the display unit.

As illustrated in FIG. 15, the display apparatus 51-1 displays the overhead view image 201, the front view image 202, the side view image 203, and the plan view image 204 to enable the second operator to change the correspondence of the consoles. The virtual viewpoint image 206 corresponding to the virtual camera 102 controlled by using the console 21-1 may also be displayed on the display unit 5. Two icons indicating two target points 103 are displayed in each image illustrated in FIG. 15. A target point 103-1 is operated by using the console 11-1, and a target point 103-2 is operated by using the console 11-2. Icons with different colors, symbols, or numbers may be displayed to identify different target points 103.

According to the above-described configuration, one target point 103 which is important in each scene is assigned a relatively large number of operation devices, and the other target point 103 is assigned a relatively small number of operation devices. In a scene of a soccer game, for example, four different first operators are operating the target points 103 to track players A, B, C, and D. When the player A is dribbling the ball, six out of 10 second operators are operating the virtual cameras 102 with reference to the target point 103 adjusted to the player A. In this case, the six operation devices operated by the six second operators are associated with the operation device operated by the first operator controlling the target point 103 adjusted to the player A.

When the ball is passed from the player A to the player B, three out of the six second operators change the target points 103 to the player B. More specifically, the operation devices operated by the three second operators are associated with the operation device operated by the first operator controlling the target point 103 adjusted to the player B. Such a method makes it possible to generate virtual viewpoint images adjusted to the player having the ball, by using more viewpoints.

When the ball is passed from the player A to the player B, the first operator who has been controlling the target point 103 adjusted to the player A may change the target point 103 to the player B. However, in this case, the target points 103 of the second operators associated with the first operator are changed from the player A to the player B at the same time. There is an advantage, as in the above-described method, that the timing of changing the target point 103 can be separately determined by the second operators if the first operators keep tracking the same player and the second operators change the correspondence with the first operators. For example, a second operator can change the target point 103 to the player B at the moment when the player A kicks the ball, and another second operator can change the target point 103 to the player B at the moment when the player B receives the ball. The remaining second operators may keep adjusting the target points 103 to the player A.

According to the above-described configuration, the plurality of first operators can control the respective target points 103, and one or more second operators can operate the virtual cameras 102 while suitably changing the target points 103. More specifically, the operators can generate virtual viewpoint images while flexibly changing the combination of the target points 103 and the virtual cameras 102.

[Adjusting Display Positions of Target Points 103]

The following describes an example of the control system 6 capable of adjusting the position of the target point 103 in the visual field of the virtual camera 102, i.e., the display position of the target point 103 in the virtual viewpoint image.

Figure 16A:
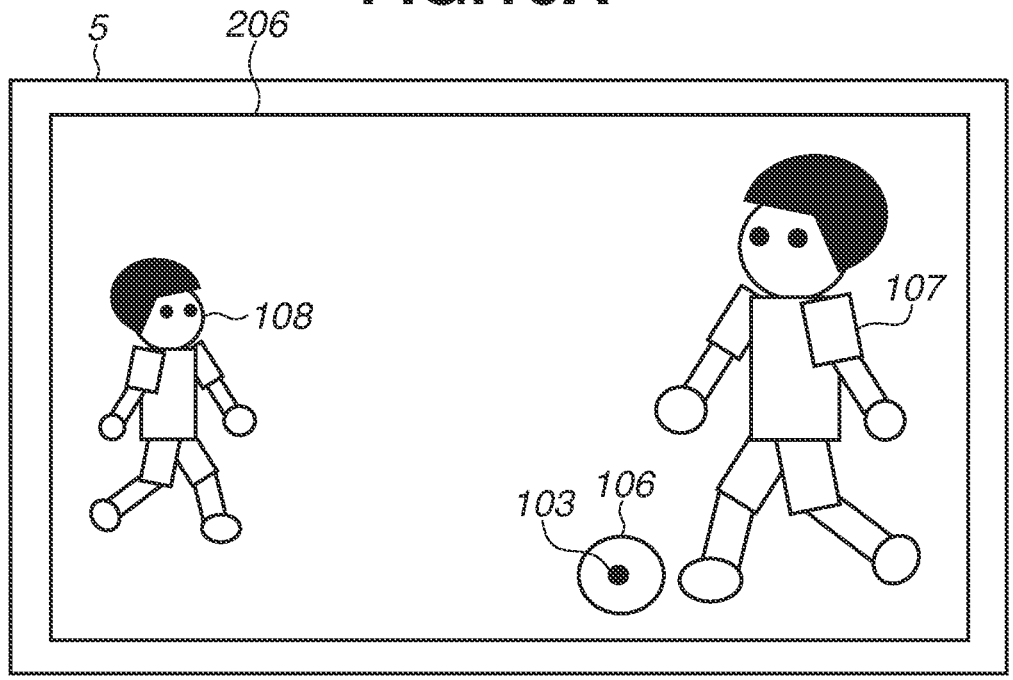
FIGS. 16A and 16B illustrate other examples of display screens on the display unit.
Figure 16B:
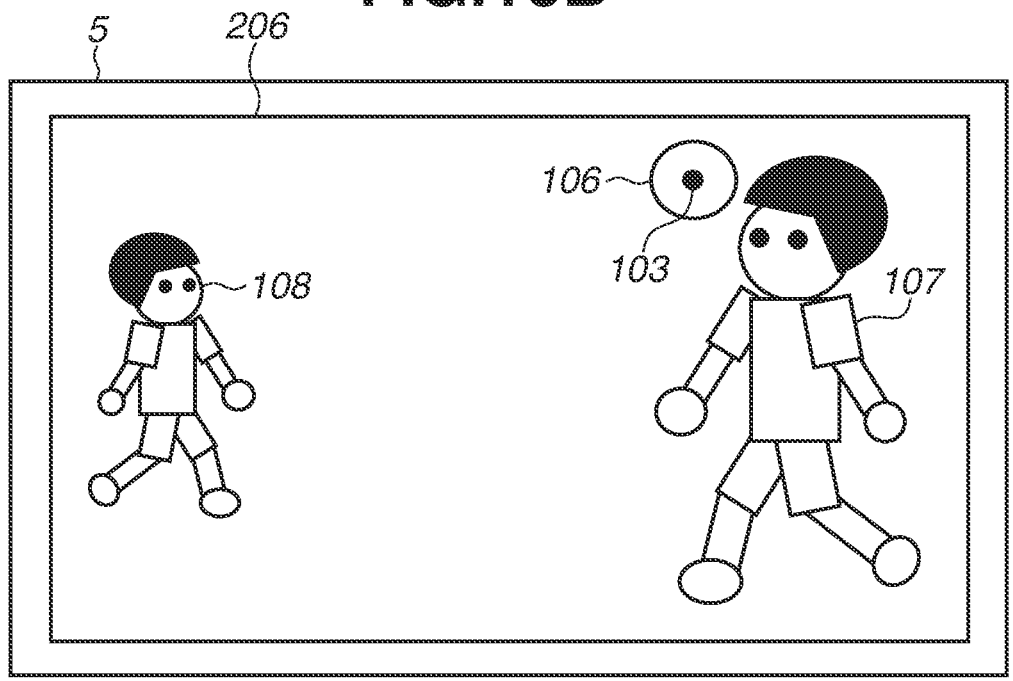

Some example cases where the target point 103 is adjusted to the ball will be described below. In a case where a ball 106 is on the ground as in the example illustrated in FIG. 16A, an excellent composition can often be obtained if the ball position (the position of the target point 103) exists at a position close to the lower part of the virtual viewpoint image 206. In particular, such a composition can be obtained if the virtual camera 102 is close to the target point 103. On the other hand, in a case where the ball 106 is above the ground as in the example illustrated in FIG. 16B, an excellent composition can often be obtained if the ball position (the position of the target point 103) exists at a position close to the upper part of the virtual viewpoint image 206. In a case where both a passing player 107 and a receiving player 108 are to be included in the visual field of the virtual camera 102, an excellent composition can often be obtained if the ball position (the position of the target point 103) exists at a position laterally deviated from the center of the image.

Figure 17:
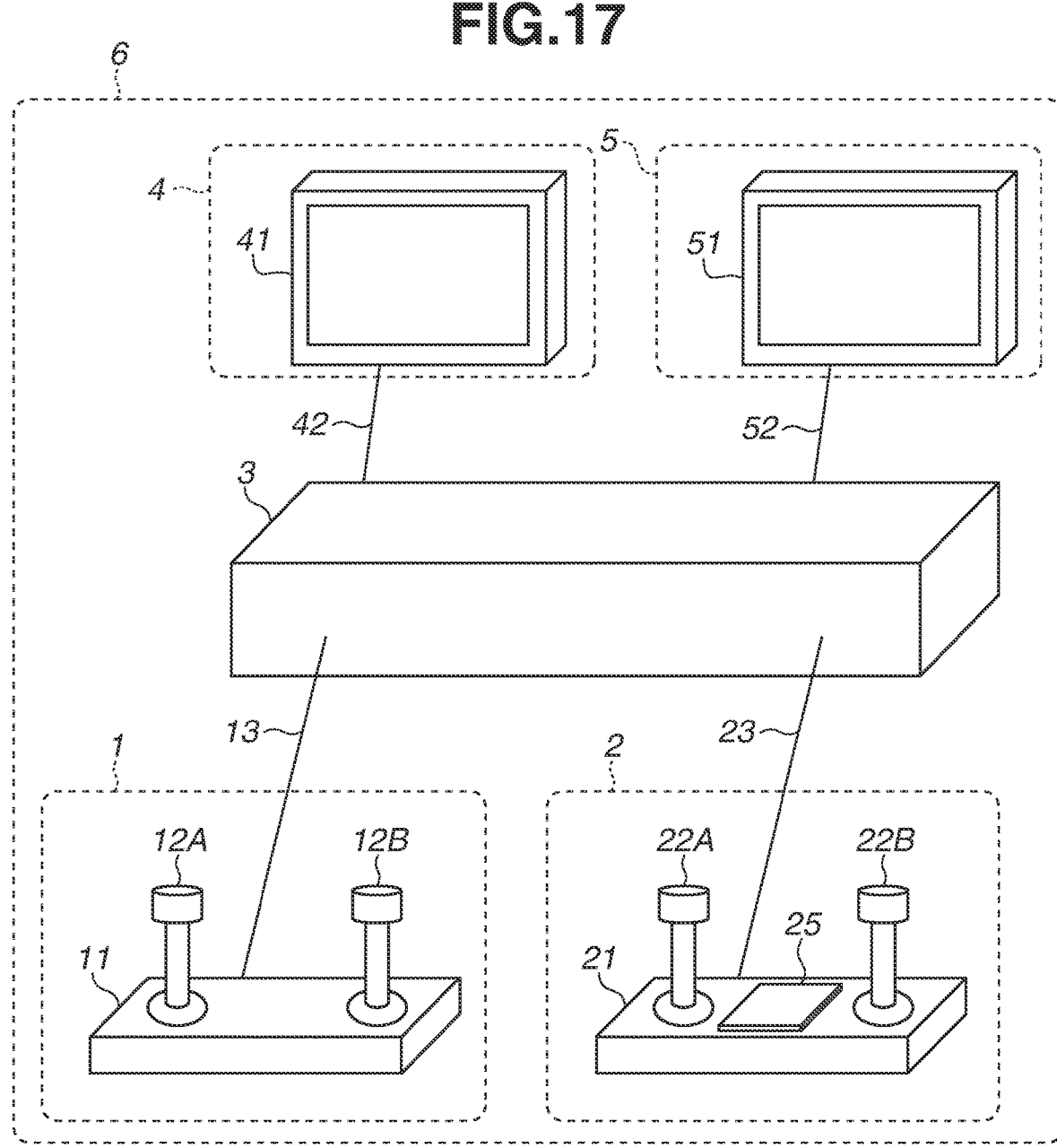
FIG. 17 illustrates still another example of a device configuration of the control system.

Referring to FIG. 17, the operation unit 2 is provided with a touch panel 25 for enabling the target point 103 to be moved to a position deviated from the center of the virtual viewpoint image. For example, when the operator single-taps the touch panel 25, the orientation of the virtual camera 102 changes so that the target point 103 is positioned at the position in the image corresponding to the tapped coordinates. When the operator flicks the touch panel 25, the position of the target point 103 in the image moves in the direction of the flick action by the distance in the image corresponding to the distance of the flick action. When the operator double-taps the touch panel 25, the position of the target point 103 returns to the center of the image. These operations for adjusting the target point 103 may be performed by using operation devices other than the touch panel 25.

As processing of the information processing apparatus 3, the viewpoint setting unit 32 acquires the difference between the three-dimensional direction vector derived from the position of the virtual camera 102 toward the position of the target point 103 and the three-dimensional direction vector derived from the position of the virtual camera 102 toward the center of the visual field of the virtual camera 102 in the three-dimensional space. Then, the viewpoint setting unit 32 adjusts the orientation of the virtual camera 102 based on the operation on the touch panel 25.

The above-described configuration makes it possible to set the direction in which the target point 103 exists when viewed from the virtual camera 102, based on the user operations. This enables moving the target point 103 from the center of the visual field of the virtual camera 102 (the center of the virtual viewpoint image), thus generating virtual viewpoint images with diverse types of compositions. As illustrated in FIGS. 11 and 14, when the operation unit 2 includes a plurality of independent operation devices, the position of the target point 103 in the virtual viewpoint image may be separately adjusted by each individual operation device.

The above-described exemplary embodiment improves the convenience of operations for setting a virtual viewpoint corresponding to a virtual viewpoint image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-129614, filed Jul. 11, 2019, which is hereby incorporated by reference herein in its entirety.

What is claimed is:

1. An information processing apparatus comprising:
one or more memories storing instructions; and
one or more processors executing the instructions to:
receive a first input;
receive a second input corresponding to an operation on a second operation unit;
receive a third input corresponding to an operation on a third operation unit;
set, based on the received first input, a target position to be included in a visual field according to a first virtual viewpoint corresponding to a first virtual viewpoint image and a visual field according to a second virtual viewpoint corresponding to a second virtual viewpoint image; and
set, based on the received second input, a position of the first virtual viewpoint relative to the set target position and view direction from the first virtual viewpoint relative to the set target position, and set, based on the received third input, a position of the second virtual viewpoint relative to the set target position and view direction from the second virtual viewpoint relative to the set target position.

2. The information processing apparatus according to claim 1, wherein the position of the first virtual viewpoint and the view direction from the first virtual viewpoint are set in an associated manner so that the target position exists in a predetermined direction when viewed from the first virtual viewpoint.

3. The information processing apparatus according to claim 2, wherein the predetermined direction is the view direction from the first virtual viewpoint.

4. The information processing apparatus according to claim 2, wherein the predetermined direction is a direction set based on a user operation.

5. The information processing apparatus according to claim 1, wherein the one or more processors further execute the instructions to receive a fourth input corresponding to an operation on a fourth operation unit, and
wherein the target position in a three-dimensional space is set based on the received first input and the received third input.

6. The information processing apparatus according to claim 1, wherein the one or more processors further execute the instructions to receive a fifth input corresponding to an operation on a fifth operation unit, and
wherein a three-dimensional position of the first virtual viewpoint, and the view direction from the first virtual viewpoint in a pan direction and a tilt direction are set based on the received second input and the received fifth input.

7. The information processing apparatus according to claim 6, wherein the view direction from the first virtual viewpoint in a roll direction based on the received fifth input.

8. The information processing apparatus according to claim 1, wherein the one or more processors further execute the instructions to set a viewing angle of the visual field according to the first virtual viewpoint based on the received second input.

9. The information processing apparatus according to claim 1, the one or more processors further execute the instructions to receive a sixth input corresponding to an operation on a sixth operation unit,
wherein a first target position is set based on the received first input and sets a second target position is set based on the received sixth input, and
wherein the position of the first virtual viewpoint and of the view direction from the first virtual viewpoint relative to a selected target position from among a plurality of target positions including the first and the second target positions are set based on the received second input.

10. The information processing apparatus according to claim 1, wherein the one or more processors further execute the instructions to:
instruct a first display unit to display an image indicating the set target position; and
instruct a second display unit to display an image according to the set position of the first virtual viewpoint and the set view direction from the first virtual viewpoint.

11. The information processing apparatus according to claim 10, wherein the first and the second display units are display units of different display apparatuses.

12. The information processing apparatus according to claim 10, wherein the first and the second display units are different display areas of the same display apparatus.

13. The information processing apparatus according to claim 1, wherein the one or more processors further execute the instructions to output information indicating the position of the set first virtual viewpoint and the set view direction from the first virtual viewpoint to a generating device configured to generate the virtual viewpoint image based on a plurality of images acquired by capturing an imaging region from different directions by using a plurality of imaging apparatuses and the output information.

14. A setting method comprising:
receiving a first input;
receiving a second input corresponding to an operation on a second operation unit;
receiving a third input corresponding to an operation on a third operation unit;
setting, based on the received first input, a target position to be included in a visual field according to a first virtual viewpoint corresponding to a first virtual viewpoint image and a visual field according to a second virtual viewpoint corresponding to a second virtual viewpoint image; and
setting, based on the received second input, a position of the first virtual viewpoint relative to the set target position and view direction from the first virtual viewpoint relative to the set target position, and set, based on the received third input, a position of the second virtual viewpoint relative to the set target position and view direction from the second virtual viewpoint relative to the set target position.

15. The setting method according to claim 14, wherein the position of the first virtual viewpoint and the view direction from the first virtual viewpoint are set in an associated manner so that the target position exists in a predetermined direction when viewed from the first virtual viewpoint.

16. The setting method according to claim 14,
wherein the first input corresponds to an operation on a first operation unit,
wherein the target position is set based on an operation on the first operation unit by a first user, and
wherein the position and orientation of the virtual viewpoint are set based on an operation on the second operation unit by a second user.

17. A non-transitory computer-readable storage medium storing a program for causing a computer to execute a setting method, the setting method comprising:
receiving a first input;
receiving a second input corresponding to an operation on a second operation unit;
receiving a third input corresponding to an operation on a third operation unit;
setting, based on the received first input, a target position to be included in a visual field according to a first virtual viewpoint corresponding to a first virtual viewpoint image and a visual field according to a second virtual viewpoint corresponding to a second virtual viewpoint image; and
setting, based on the received second input, a position of the first virtual viewpoint relative to the set target position and view direction from the first virtual viewpoint relative to the set target position, and set, based on the received third input, a position of the second virtual viewpoint relative to the set target position and view direction from the second virtual viewpoint relative to the set target position.

18. The information processing apparatus according to claim 1, wherein the first input corresponds to an operation on a first operation unit.

19. The information processing apparatus according to claim 18, wherein the first and the second operation units are operation units separately provided in different housings.

20. The information processing apparatus according to claim 18, wherein the first and the second operation units are different joy sticks.

* * * * *